United States Patent
Zhao et al.

(10) Patent No.: US 12,409,494 B2
(45) Date of Patent: Sep. 9, 2025

(54) METHOD FOR PREPARING HIGH-PURITY POWDER MATERIAL, APPLICATION THEREOF, AND DOUBLE-PHASE POWDER MATERIAL

(71) Applicant: Yuanyun Zhao, Guangdong (CN)

(72) Inventors: Yuanyun Zhao, Guangdong (CN); Li Liu, Guangdong (CN)

(73) Assignee: Yuanyun Zhao, Dongguan (CN)

( * ) Notice: Subject to any disclaimer, the term of this patent is extended or adjusted under 35 U.S.C. 154(b) by 0 days.

(21) Appl. No.: 18/022,246

(22) PCT Filed: Dec. 8, 2020

(86) PCT No.: PCT/CN2020/134655
§ 371 (c)(1),
(2) Date: Feb. 20, 2023

(87) PCT Pub. No.: WO2022/036938
PCT Pub. Date: Feb. 24, 2022

(65) Prior Publication Data
US 2024/0033822 A1 Feb. 1, 2024

(30) Foreign Application Priority Data

Aug. 19, 2020 (CN) .......................... 202010838571.8

(51) Int. Cl.
| | | |
|---|---|---|
| *B22F 9/08* | (2006.01) | |
| *B22F 1/05* | (2022.01) | |
| *B22F 1/054* | (2022.01) | |
| *B22F 1/142* | (2022.01) | |
| *B22F 1/145* | (2022.01) | |
| *C22C 1/02* | (2006.01) | |
| *C22C 9/10* | (2006.01) | |
| *C22C 11/04* | (2006.01) | |
| *C22C 14/00* | (2006.01) | |
| *C22C 18/00* | (2006.01) | |
| *C22C 19/03* | (2006.01) | |
| *C22C 27/02* | (2006.01) | |
| *C22C 27/06* | (2006.01) | |
| *C22C 28/00* | (2006.01) | |
| *C22C 30/00* | (2006.01) | |
| *C22C 33/04* | (2006.01) | |
| *C22C 38/00* | (2006.01) | |
| *C22C 38/22* | (2006.01) | |
| *C22C 38/28* | (2006.01) | |

(52) U.S. Cl.
CPC .............. *B22F 9/082* (2013.01); *B22F 1/05* (2022.01); *B22F 1/056* (2022.01); *B22F 1/142* (2022.01); *B22F 1/145* (2022.01); *C22C 1/02* (2013.01); *C22C 9/10* (2013.01); *C22C 11/04* (2013.01); *C22C 14/00* (2013.01); *C22C 18/00* (2013.01); *C22C 19/03* (2013.01); *C22C 27/02* (2013.01); *C22C 27/06* (2013.01); *C22C 28/00* (2013.01); *C22C 30/00* (2013.01); *C22C 33/04* (2013.01); *C22C 38/005* (2013.01); *C22C 38/22* (2013.01); *C22C 38/28* (2013.01); *B22F 2201/20* (2013.01); *B22F 2301/10* (2013.01); *B22F 2301/15* (2013.01); *B22F 2301/20* (2013.01); *B22F 2301/205* (2013.01); *B22F 2301/30* (2013.01); *B22F 2301/35* (2013.01); *B22F 2304/054* (2013.01); *B22F 2304/10* (2013.01); *B22F 2998/10* (2013.01); *B22F 2999/00* (2013.01)

(58) Field of Classification Search
None
See application file for complete search history.

(56) References Cited

U.S. PATENT DOCUMENTS

| | | | | |
|---|---|---|---|---|
| 3,859,086 A | * | 1/1975 | Church | ................. C22C 19/055 |
| | | | | 419/30 |
| 2017/0292174 A1 | * | 10/2017 | Karabin | ................. B22F 10/34 |
| 2021/0178469 A1 | * | 6/2021 | Liu | ......................... C22C 38/22 |

FOREIGN PATENT DOCUMENTS

| | | |
|---|---|---|
| CN | 103317141 A | 9/2013 |
| CN | 106811750 A | 6/2017 |

(Continued)

OTHER PUBLICATIONS

English translation of CN 111334682 (originally published Jun. 26, 2020), obtained from PE2E search.*

(Continued)

*Primary Examiner* — George Wyszomierski

(57) ABSTRACT

The present disclosure provides a method for preparing a high-purity powder material, an application thereof, and a double-phase powder material. The high-purity powder material is prepared through an "atomization comminuting process and de-phasing method". The preparation method comprises the following steps: firstly preparing intermediate alloy powders with first-phase particles wrapped by a second-phase matrix through an atomization comminuting process. Impurity elements are enriched into the second-phase matrix and the first-phase particles are purified during the solidification of the intermediate alloy powders; By removing the second-phase matrix in the intermediate alloy powders, a high-purity target powder material originated from the original first-phase particles can be obtained. The preparation method of the present disclosure has the characteristics of a simple process, easy operation, and low cost, and can be used to prepare nano-level, sub-micron-level, and micro-level multiple high-purity powder materials, which has a good application prospect in catalytic materials, powder metallurgy.

10 Claims, No Drawings

(56) References Cited

FOREIGN PATENT DOCUMENTS

| | | |
|---|---|---|
| CN | 106916988 A | 7/2017 |
| CN | 107406251 A | 11/2017 |
| CN | 111334682 A | 6/2020 |
| CN | 111590084 A | 8/2020 |
| CN | 111940750 A | 11/2020 |
| CN | 111945000 A | 11/2020 |
| CN | 112404445 A | 2/2021 |
| JP | 06299208 A | 10/1994 |

OTHER PUBLICATIONS

International Search Report of PCT/CN2020/134655, mailed May 19, 2021.
Written Opinion of PCT/CN2020/134655, mailed May 19, 2021.

* cited by examiner

METHOD FOR PREPARING HIGH-PURITY POWDER MATERIAL, APPLICATION THEREOF, AND DOUBLE-PHASE POWDER MATERIAL

CROSS-REFERENCE TO RELATED APPLICATIONS

This application is a national stage application of PCT/CN2020/134655. This application claims priorities from PCT Application No. PCT/CN2020/134655, filed Dec. 8, 2020, and from the Chinese patent application 202010838571.8 filed Aug. 19, 2020, the content of which are incorporated herein in the entirety by reference.

TECHNICAL FIELD

The present disclosure relates to the technical field of micro-nano powder materials, and in particular, to a method for preparing a high-purity powder material, an application thereof, and a double-phase powder material.

BACKGROUND

An atomization comminuting process is a powder preparation method for crushing metal or alloy liquid into fine liquid drops by the impact of a rapidly moving fluid (atomizing medium) or by other methods and then condensing the fine liquid drops into solid powders. The atomization comminuting process mainly comprises gas atomization, water atomization, water and gas combined atomization, vacuum atomization, plasma atomization, centrifugal atomization, rotating disk atomization, rotating electrode atomization, and ultrasonic atomization.

Due to limitations of the conventional atomization comminuting process, the cost of obtaining a large amount of ultrafine metal powders with a particle size smaller than 10 μm through the atomization comminuting process is extremely high, and sub-micron and nanopowders with a dimension below 1 μm are difficult to obtain through the atomization comminuting process. In addition, control of impurities during the atomization comminuting process (particularly the removal of oxygen impurities) is also a key problem to be urgently solved. In order to obtain high-purity metal powders, in current technical conditions, high-purity metal raw materials are essential while, other impurity elements introduced during smelting and atomization must also be strictly controlled, resulting in a greatly increased preparation cost of the metal powders. Therefore, based on the present atomization comminuting process, the development of new methods for preparing high-purity ultrafine metal powder materials is of great significance.

SUMMARY

Based on the foregoing, it is necessary to provide a method for preparing a high-purity powder material that is simple in technology and easy to operate.

In one embodiment, the method for preparing a high-purity powder material includes the following steps:
at step 1, selecting initial alloy raw materials and melting the initial alloy raw materials based on an ingredient ratio of the initial alloy to obtain a homogeneous initial alloy melt;
at step 2, atomizing and solidifying the initial alloy melt through an atomization comminuting process to obtain an intermediate alloy powder; wherein the intermediate alloy powder includes a first phase and a second phase, the first phase is granular, the second phase is a matrix phase with a melting point lower than that of the first phase, and the first-phase particle is wrapped in the second-phase matrix; wherein during the atomization comminuting process, impurity elements in the initial alloy melt and introduced during an atomizing solidification process are enriched in the second-phase matrix such that the first-phase particles are purified;
at step 3, removing the second-phase matrix in the intermediate alloy powder, and retaining the first-phase particles, wherein the impurity elements enriched in the second-phase matrix are removed together with the second-phase matrix such that a high-purity target metal power material composed of the first-phase particles is obtained.

In step 1,
furthermore, the impurity element in the initial alloy melt is T, T includes at least one of O, H, N, P, S, F, Cl, I, and Br, and the total content of these impurity elements is the content of the impurity element T;
furthermore, the impurity element in the initial alloy melt comes from a source including: impurities introduced by the initial alloy raw material and impurities introduced by an atmosphere or crucible in a melting process.

Wherein, the atmosphere-introduced impurities refer to impurities such as O, N, and H in an environmental atmosphere, which are absorbed by the alloy melt.

Furthermore, if the raw material is each simple substance or intermediate alloy containing impurity elements, the raw material can be prepared into an initial alloy melt according to the ingredient ratio by melting. If the raw material is raw alloy material corresponding to the ingredient of the initial alloy melt, the raw material can be remolten to obtain an initial alloy melt.

Furthermore, the initial alloy raw material includes an M-T raw material including the impurity element T. For example, when M is Ti and T includes O, the M-T raw material includes a Ti—O raw material containing O impurity.

Furthermore, the average ingredient of the initial alloy melt comprises any one of the following combinations (1)-(4):

combination (1): the major average ingredient of the initial alloy melt is $A_a(M_xD_y)_bT_d$, A includes at least one of Y, La, Ce, Pr, Nd, Pm, Sm, Eu, Gd, Tb, Dy, Ho, Er, Tm, Yb and Lu, M includes at least one of W, Cr, Mo, V, Ta, Nb, Zr, Hf and Ti, D includes at least one of Fe, Co and Ni, x, y; a, b and c represent the atomic percent contents of corresponding constituent elements respectively, and 0.5%≤a≤99.5%, 0.5%≤b≤99.5% and 0≤d≤10%;

Preferably, A is selected from at least one of Y, La, Ce, Pr, Nd, Pm, Sm, Eu, Gd, Tb, Dy, Ho, Er, Tm, Yb, and Lu; preferably, M is selected from at least one of W, Cr, Mo, V, Ta, Nb, Zr, Hf and Ti; preferably, D is selected from at least one of Fe, Co, and Ni;

preferably, 0.5%≤a≤99.4%, 0.5%≤b≤99.4% and 0≤d≤10%; preferably, 1%≤a≤99%, 1%≤b≤99% and 0≤d≤10%; preferably, 1%≤a≤98.9%, 1%≤b≤98.9% and 0<d≤10%; preferably, 2%≤a≤98%, 2%≤b≤98% and 0≤d≤10%; preferably, 2%≤a≤97.9%, 2%≤b≤97.9% and 0<d≤10%;

furthermore, 5%≤x≤55% and 45%≤y≤95%, and molar ratio x:y=0.9 to 1.1; preferably, x=y=50%, namely the molar ratio x:y=1:1;

combination (2): the major average ingredient of the initial alloy melt is $A_aM_bT_d$, A includes at least one of Mg, Ca, Li, Na, K, Cu, Y, La, Ce, Pr, Nd, Pm, Sm, Eu, Gd, Tb, Dy, Ho, Er, Tm, Yb and Lu, M includes at least one of W, Cr, Mo, V, Ta, Nb, Zr, Hf, and Ti; a, b and c represent the atomic percent contents of corresponding constituent elements respectively, and $0.5\% \leq a \leq 99.5\%$, $0.5\% \leq b \leq 99.5\%$ and $0 \leq d \leq 10\%$;

preferably, when M includes at least one of W, Cr, Mo, V, Ta, Nb, Zr, Hf and Ti, A includes one of Y, La, Ce, Pr, Nd, Pm, Sm, Eu, Gd, Tb, Dy, Ho, Er, Tm, Yb and Lu;

preferably, when M includes at least one of W, Cr, Mo, V, Ta, Nb, Zr, Hf and Ti, A includes Cu;

preferably, A is selected from at least one of Mg, Ca, Li, Na, K, Cu, Y, La, Ce, Pr, Nd, Pm, Sm, Eu, Gd, Tb, Dy, Ho, Er, Tm, Yb, and Lu; preferably, M is selected from at least one of W, Cr, Mo, V, Ta, Nb, Zr, Hf and Ti;

preferably, $0.5\% \leq a \leq 99.4\%$, $0.5\% \leq b \leq 99.4\%$ and $0 < d \leq 10\%$; preferably, $1\% \leq a \leq 99\%$, $1\% \leq b \leq 99\%$ and $0 \leq d \leq 10\%$; preferably, $1\% \leq a \leq 98.9\%$, $1\% \leq b \leq 98.9\%$ and $0 < d \leq 10\%$; preferably, $2\% \leq a \leq 98\%$, $2\% \leq b \leq 98\%$ and $0 \leq d \leq 10\%$; preferably, $2\% \leq a \leq 97.9\%$, $2\% \leq b \leq 97.9\%$ and $0 < d \leq 10\%$;

combination (3): the major average ingredient of the initial alloy melt is $A_aM_bT_d$, A includes at least one of Zn, Mg, Sn, Pb, Ga, In, Al, La, Ge, Cu, K, Na and Li, M includes at least one of Be, B, Bi, Fe, Ni, Cu, Ag, Si, Ge, Cr and V, and the proportion of the atomic percent contents of Be, B, Si, and Ge in M to M is smaller than 50%; a, b and c represent the atomic percent contents of corresponding constituent elements respectively, and $0.5\% \leq a \leq 99.5\%$, $0.5\% \leq b \leq 99.5\%$ and $0 \leq d \leq 10\%$;

preferably, A includes at least one of Zn, Mg, Sn, Pb, Ga, In, Al, La, Ge, Cu, K, Na, and Li, M includes at least one of Be, B, Bi, Fe, Ni, Cu, Ag, Si, Ge, Cr and V, and when M includes Fe and Ni, M does not include Cr and V;

preferably, A is selected from at least one of Zn, Mg, Sn, Pb, Ga, In, Al, La, Ge, Cu, K, Na, and Li; preferably, M is selected from at least one of Be, B, Bi, Fe, Ni, Cu, Ag, Si, Ge, Cr and V, and when M includes Fe and Ni, M does not include Cr and V;

when the proportion of the atomic percent contents of Be, B, Si, and Ge in M to M is smaller than 50%, the fact that the subsequent material mainly composed of M is mainly metal material can be ensured.

preferably, M includes at least one of Be, B, Bi, Fe, Ni, Cu, Ag, Si, Ge, Cr, and V, the proportion of the atomic percent contents of Be, B, Si, and Ge in M to M is smaller than 30%;

preferably, A includes at least one of Zn, Mg, Sn, Pb, Ga, In, Al, La, Ge, Cu, K, Na, and Li; preferably, M includes at least one of Be, Bi, Fe, Ni, Cu, Ag, Cr and V, a, b and c represent the atomic percent contents of corresponding constituent elements respectively, and $0.5\% \leq a \leq 99.5\%$, $0.5\% \leq b \leq 99.5\%$ and $0 \leq d \leq 10\%$;

preferably, when M includes B, A includes at least one of Sn, Ge, Cu, and Zn; when M includes Bi, A includes at least one of Sn, Ga, and Al;

preferably, when M includes at least one of Fe, Ni, Cu, and Ag, A includes at least one of La, In, Na, K, Li, Pb, and Mg; preferably, when M includes at least one of Fe and Ni, A includes at least one of La, In, Na, K, Li, and Mg; when M includes at least one of Cu and Ag, A includes at least one of Pb, Na, K, and Li;

preferably, when M includes at least one of Si and Ge, A includes at least one of Zn, Sn, Pb, Ga, In, and Al;

preferably, when M includes at least one of Cr and V, A includes Zn;

preferably, $0.5\% \leq a \leq 99.4\%$, $0.5\% \leq b \leq 99.4\%$ and $0 < d \leq 10\%$; preferably, $1\% \leq a \leq 99\%$, $1\% \leq b \leq 99\%$ and $0 \leq d \leq 10\%$; preferably, $1\% \leq a \leq 98.9\%$, $1\% \leq b \leq 98.9\%$ and $0 < d \leq 10\%$; preferably, $2\% \leq a \leq 98\%$, $2\% \leq b \leq 98\%$ and $0 \leq d \leq 10\%$; preferably, $2\% \leq a \leq 97.9\%$, $2\% \leq b \leq 97.9\%$ and $0 < d \leq 10\%$;

combination (4): when the major average ingredient of the initial alloy melt is $A_aM_bAl_cT_d$, A includes at least one of Y, La, Ce, Pr, Nd, Pm, Sm, Eu, Gd, Tb, Dy, Ho, Er, Tm, Yb and Lu; M includes at least one of W, Cr, Mo, V, Ta, Nb, Zr, Hf, and Ti; Al is aluminum; a, b, c and d represent the atomic percent contents of corresponding constituent elements respectively, and $0.5\% \leq a \leq 99.4\%$, $0.5\% \leq b \leq 99.4\%$, $0.1\% \leq c \leq 25\%$ and $0 \leq d \leq 10\%$;

preferably, A is selected from at least one of Y, La, Ce, Pr, Nd, Pm, Sm, Eu, Gd, Tb, Dy, Ho, Er, Tm, Yb and Lu; preferably, M is selected from at least one of W, Cr, Mo, V, Ta, Nb, Zr, Hf and Ti;

preferably, $0.5 \leq a \leq 99.3\%$, $0.5 \leq b \leq 99.3\%$, $0.1\% \leq c \leq 25\%$ and $0 < d \leq 10\%$; preferably, $1 \leq a \leq 98.9\%$, $1 \leq b \leq 98.9\%$, $0.1\% \leq c \leq 25\%$ and $0 < d \leq 10\%$; preferably, $1 \leq a \leq 98.8\%$, $1 \leq b \leq 98.8\%$, $0.1\% \leq c \leq 25\%$ and $0 < d \leq 10\%$; preferably, $2 \leq a \leq 97.9\%$, $2 \leq b \leq 97.9\%$, $0.1\% \leq c \leq 25\%$ and $0 \leq d \leq 10\%$; preferably, $2 \leq a \leq 97.8\%$, $2 \leq b \leq 97.8\%$, $0.1\% \leq c \leq 25\%$ and $0 < d \leq 10\%$;

furthermore, the average ingredient of the initial alloy melt is any one of the above combinations (1)-(4);

furthermore, the combination of A and M in the average ingredient of the initial alloy melt in the step 1 is extremely important, the selection principle is to ensure that an intermetallic compound between A and M can not be formed during the solidification of the alloy melt; or even if M and other elements (D) can form a high-melting-point intermetallic compound, an intermetallic compound is still not formed between A and M. Therefore, a two-phase separation between a matrix phase with a major average ingredient of A and a particle phase with a major average ingredient of M(D) can be achieved during the solidification process of the initial alloy melt, thus facilitating the subsequent preparation process of powder material with a major average ingredient of M(D).

In step 2, furthermore, the intermediate alloy powder does not contain an intermetallic compound formed by A and M;

furthermore, the intermediate alloy powder does not contain an intermetallic compound formed by A and D;

furthermore, no matter what type of atomization comminuting process is used, the morphology of the prepared intermediate alloy powder is different from that of alloy ribbons or alloy ingots obtained by other solidification processes. The principles of alloy melt solidification are also different. For example, the atomization comminuting process prepares powders through the principle of "melt atomization-droplet solidification".

Furthermore, when the average ingredient of the initial alloy melt is described in the combination (1) of step 1, a first particle phase with the major ingredient of $(M_xD_y)_{x1}T_{z1}$ and a second phase matrix with the major ingredient of $A_{x2}T_{z2}$ is formed in the intermediate alloy powder; wherein, $98\% \leq x1 \leq 100\%$ and $0 \leq z1 \leq 2\%$; $70\% \leq x2 \leq 100\%$ and $0 \leq z2 \leq 30\%$; $z1 \leq d \leq z2$ and $2z1 \leq z2$;

x1, z1, x2, and z2 represent the atomic percent contents of corresponding constituent elements respectively;

preferably, 98%≤x1<100% and 0<z1≤2%; 70%≤x2<100% and 0<z2≤30%; z1<d<z2 and 2z1<z2;

preferably, 98.5%≤x1≤100% and 0≤z1≤1.5%; 70%≤x2≤100% and 0≤z2≤30%; z1≤d≤z2 and 2z1≤z2;

preferably, 98.5%≤x1<100% and 0<z1≤1.5%; 70%≤x2<100% and 0<z2≤30%; z1<d<z2 and 2z1<z2;

preferably, 99%≤x1≤100% and 0≤z1≤1%; 70%≤x2≤100% and 0≤z2≤30%; z1≤d≤z2 and 2z1≤z2;

preferably, 99%≤x1<100% and 0<z1≤1%; 70%≤x2<100% and 0<z2≤30%; z1<d<z2 and 2z1<z2;

preferably, when the average ingredient of the initial alloy melt is described in the combination (1) of step 1, the first-phase particle with the major ingredient of $(M_xD_y)_{x1}T_{z1}$ does not contain element A.

Preferably, when the average ingredient of the initial alloy melt is described in the combination (1) of step 1, the ingredient of the first-phase particle is $(M_xD_y)_{x1}T_{z1}$.

Furthermore, when the average ingredient of the initial alloy melt is described in the combination (2) or combination (3) of step 1, a first-phase particle with the major ingredient of $M_{x1}T_{z1}$ and a second phase matrix with the major ingredient of $A_{x2}T_{z2}$ is formed in the intermediate alloy powder; wherein, 98%≤x1≤100% and 0≤z1≤2%; 70%≤x2≤100% and 0≤z2≤30%; z1≤d≤z2 and 2z1≤z2; x1, z1, x2, and z2 represent the atomic percent contents of corresponding constituent elements respectively;

preferably, 98%≤x1<100% and 0<z1≤2%; 70%≤x2<100% and 0<z2≤30%; z1<d<z2 and 2z1<z2;

preferably, 98.5%≤x1≤100% and 0≤z1≤1.5%; 70%≤x2≤100% and 0≤z2≤30%; z1≤d≤z2 and 2z1≤z2;

preferably, 98.5%≤x1<100% and 0<z1≤1.5%; 0%≤x2<100% and 0<z2≤30%; z1<d<z2 and 2z1<z2;

preferably, 99%≤x1≤100% and 0≤z1≤1%; 70%≤x2≤100% and 0≤z2≤30%; z1≤d≤z2 and 2z1≤z2;

preferably, 99%≤x1<100% and 0<z1≤1%; 70%≤x2<100% and 0<z2≤30%; z1<d<z2 and 2z1<z2;

preferably, when the average ingredient of the initial alloy melt is described in the combination (2) or combination (3) of step 1, the first-phase particle with the major ingredient of $M_{x1}T_{z1}$ does not contain element A.

preferably, when the average ingredient of the initial alloy melt is described in the combination (2) or combination (3) of step 1, the ingredient of the first-phase particle is $M_{x1}T_{z1}$.

furthermore, when the average ingredient of the initial alloy melt is described in the combination (4) of step 1, a first-phase particle with the major ingredient of $M_{x1}Al_{y1}T_{z1}$ and a second phase matrix with the major ingredient of $A_{x2}Al_{y2}T_{z2}$ is formed in the intermediate alloy powder; wherein, 78%≤x1≤99.9%, 0.1%≤y1≤22% and 0≤z1≤2%; 70%≤x2≤99.8%, 0.2%≤y2≤30%, and 0≤z2≤30%, z1≤d≤z2, 2z1≤z2 and y1<y2; x1, y1, z1, x2, y2, and z2 represent the atomic percent contents of corresponding constituent elements respectively;

preferably, 78%≤x1≤99.8%, 0.1%≤y1≤21.9% and 0<z1≤2%; 70%≤x2≤99.7%, 0.2%≤y2≤29.9%, 0<z2≤30%, z1<d<z2, and 2z1<z2;

preferably, 78%≤x1≤99.9%, 0.1%≤y1≤22% and 0≤z1≤1.5%; 70%≤x2≤99.8%, 0.2%≤y2≤30%, 0≤z2≤30%, z1≤d≤z2, and 2z1≤z2;

preferably, 78%≤x1≤99.8%, 0.1%≤y1≤21.9% and 0<z1≤1.5%; 70%≤x2≤99.7%, 0.2%≤y2≤29.9%, 0<z2≤30%, z1<d<z2, and 2z1<z2;

preferably, 78%≤x1≤99.9%, 0.1%≤y1≤22% and 0≤z1≤1%; 70%≤x2≤99.8%, 0.2%≤y2≤30%, 0≤z2≤30%, z1≤d≤z2, and 2z1≤z2;

preferably, 78%≤x1≤99.8%, 0.1%≤y1≤21.9% and 0<z1≤1%; 70%≤x2≤99.7%, 0.2%≤y2≤29.9%, 0<z2≤30%, z1<d<z2, and 2z1<z2;

preferably, y1<y2;

preferably, when the average ingredient of the initial alloy melt is described in the combination (4) of the step 1, the first-phase particle with the major ingredient of $M_{x1}Al_{y1}T_{z1}$ does not contain element A.

Preferably, when the average ingredient of the initial alloy melt is described in the combination (4) of the step 1, the ingredient of the first-phase particle is $M_{x1}Al_{y1}T_{z1}$.

Furthermore, during the atomization comminuting process, the impurity elements in the initial alloy melt are enriched in the second-phase matrix, thereby ensuring the first-phase particles are purified;

furthermore, z1≤d≤z2 and 3z1≤z2; preferably, z1≤d≤z2, 3z1≤z2, and 0≤z1≤1%;

furthermore, z1<d<z2 and 3z1<z2; namely the content of impurity T in the first-phase particle is lower than that of impurity T in the initial alloy melt, and three times the content of impurity T in the first-phase particle is still lower than the content of impurity T in the initial alloy melt; preferably, z1<d<z2, 3z1<z2, and 0<z1<1%.

Furthermore, when the initial alloy raw material includes an M-T raw material containing the impurity element T, the atomic percent content z1 of the impurity element T in the first-phase particle is smaller than that of the impurity element T in the M-T raw material.

It is noted that, in the present disclosure, the T impurity content is expressed by using an atomic percent content. The composition of the elements can be represented by using the atomic percent contents of the elements such that the increase or decrease of the contents of the elements. For example, the increase or decrease of the contents of the impurity elements can be accurately expressed using the concept of substance amount. If the contents of various elements are represented by using weight percent contents (or PPM) of the elements, an incorrect conclusion is easy to make due to the different atomic weights of the elements. For example, if an alloy with an atomic percent content of $Ti_{45}Gd_{45}O_{10}$ contains 100 atoms, where the atomic percent content of O is 10 at %. The 100 atoms are divided into $Ti_{45}O_4$ (atomic percent composition is $Ti_{91.8}O_{8.2}$) and $Gd_{45}O_6$ (atomic percent composition is $Gd_{88.2}O_{11.8}$). The atomic percent content of oxygen in $Gd_{45}O_6$ is increased to 11.8 at %, and the atomic percent content of oxygen in $Ti_{45}O_4$ is decreased to 8.2 at %, and thus it is accurately shown that O is enriched in Gd. If measured by a weight percent content of O, the weight percent content of O in $Ti_{45}Gd_{45}O_{10}$ is 1.70 wt %, the weight percent contents of O in $Ti_{45}O_4$ and $Gd_{45}O_6$ are 2.9 wt. % and 1.34 wt. % respectively. In this case, an incorrect conclusion that the content of O in $Ti_{45}O_4$ is increased compared with the content of O in $Gd_{45}O_6$ can be made.

Furthermore, the atomization comminuting process includes at least one of gas atomization, water atomization, water and gas combined atomization, vacuum atomization, plasma atomization, centrifugal atomization, rotating disk atomization, and rotating electrode atomization.

Furthermore, the particle shape of the intermediate alloy powder includes spheroidal shape, sub-spheroidal shape, drop shape, dumbbell shape, and irregular rod or ribbon shape.

By adjusting atomization parameters, the initial alloy melt can be disintegrated into liquid drops with different particle sizes through an atomization comminuting process, and the liquid drops can be further solidified into intermediate alloy powders with different particle sizes. When the atomizing medium energy is high enough, intermediate alloy powders with small particle sizes can be obtained, and the solidification rate of the intermediate alloy powders is relatively high; when the atomizing medium energy is low, intermediate alloy powders with large particle sizes can be obtained, and the solidification rate of the intermediate alloy powders is relatively low.

Furthermore, the particle size of the intermediate alloy powders is in a range of 1 μm to 8 mm; furthermore, the particle size of the intermediate alloy powders is in a range of 1 μm to 4 mm; furthermore, the particle size of the intermediate alloy powders is in a range of 1 μm to 1 mm; furthermore, the particle size of the intermediate alloy powders is in a range of 1 μm to 250 μm; furthermore, the particle size of the intermediate alloy powders is in a range of 1 μm to 100 μm; furthermore, the particle size of the intermediate alloy powders is in a range of 1 μm to 50 μm; furthermore, the particle size of the intermediate alloy powders is in a range of 1 μm to 20 μm;

furthermore, the particle size of the first-phase particles in the intermediate alloy powders is related to the atomizing solidification rate of the initial alloy melt; generally, the particle size of the first-phase particles in the intermediate alloy powders is in negative correlation with the atomizing solidification rate of the initial alloy melt; namely, the higher the atomizing solidification rate of the initial alloy melt, the smaller the particle size of the first-phase particles in the intermediate alloy powders.

Furthermore, when the atomizing solidification rate of the initial alloy melt is $10^3$ K/s-$10^6$ K/s, the intermediate alloy powders with a size of mainly micron-scale can be obtained.

Furthermore, when the atomizing solidification rate of the initial alloy melt is 50K/s-$10^3$ K/s, the intermediate alloy powders with a size of mainly several hundred-micron scale or millimeter-level scale can be obtained.

Furthermore, the volume fraction of the first-phase particles in the intermediate alloy powders is controlled by the contents of A and M in the intermediate alloy powders; generally, the atomic percent content of M in the intermediate alloy powders is 0.5%≤b≤99.5% or 0.5%≤b≤99.4%, thus the volume fraction of the first-phase particles with a major average ingredient of M is also approximately close to the same ratio.

Furthermore, the volume percent content of the first-phase particles in the intermediate alloy powders is in a range of 0.5% to 99.5%;

Furthermore, the accurate value of the volume fraction of the first-phase particles in the intermediate alloy powders can be confined according to the average ingredient of the intermediate alloy powders, the ingredients of the first phase and the second phase, in combination with the atomic weight and density of each element, and can also be calculated according to these parameters.

Furthermore, the structure in which the first-phase particle is wrapped in the second-phase matrix includes: a mosaic structure in which a plurality of the first-phase particles are distributed in the second-phase matrix in a dispersed manner, or a core-shell structure in which a single first-phase particle is inside and the second-phase matrix is outside;

Furthermore, the particle size of the first-phase particles in the intermediate alloy powders is in a range of 3 nm to 7.9 mm;

furthermore, the particle size of the first-phase particles in the intermediate alloy powders is in a range of 3 nm to 3.9 mm;

furthermore, the particle size of the first-phase particles in the intermediate alloy powders is in a range of 3 nm to 0.95 mm;

furthermore, the particle size of the first-phase particles in the intermediate alloy powders is in a range of 3 nm to 245 μm;

furthermore, the particle size of the first-phase particles in the intermediate alloy powders is in a range of 3 nm to 96 μm;

furthermore, the particle size of the first-phase particles in the intermediate alloy powders is in a range of 3 nm to 47 μm;

furthermore, the particle size of the first-phase particles in the intermediate alloy powders is in a range of 3 nm to 18.5 μm;

furthermore, when the b value content in the initial alloy with the major ingredient of $A_a(M_xD_y)_bT_d$, $A_aM_bT_d$ or $A_aM_bAl_cT_d$ is low, such as 0.5%≤b≤75%, the volume percent content of the first-phase particles with the major ingredients of $(M_xD_y)_{x1}T_{z1}$, $A_{x1}T_{z1}$ or $A_{x1}Al_{y1}T_{z1}$ in an intermediate alloy powder is low during the atomizing solidification process of liquid drops, the first-phase particles are easy to precipitate into a large number of dispersed particles within the second-phase matrix.

Furthermore, when 0.5%≤b≤75% and the cooling rate of the atomized liquid drops is high, the first-phase particles in the intermediate alloy powder do not have enough time to fully grow and can mainly form nano-level (such as 3 nm to 100 nm) or sub-micron-level (such as 100 nm to 1 μm) first-phase particles;

furthermore, when 0.5%≤b≤75% and the cooling rate of the atomized liquid drops is low, the first-phase particles can fully grow and can mainly form sub-micron-level (such as 100 nm to 1 μm) or micron-level (such as 1 μm to 100 μm) first-phase particles.

It should be noted that here, the atoms of the second-phase matrix elements in the intermediate alloy powder are generally larger than those of the first-phase particle elements, therefore a high-volume percent content can be obtained for the second-phase matrix which has a small atomic percent content. For example, an initial alloy with atomic percent composition of $La_{25}Fe_{75}$ ((regardless of impurities), here b=75%, the intermediate alloy powders composed of La matrix and the first-phase Fe particles can be obtained by an atomization comminuting process, wherein the weight percent composition of La and Fe is 45.33 wt % and 54.67 wt %, respectively. Considering that the density of La and Fe is 6.2 g/cm$^3$ and 7.8 g/cm$^3$, respectively, the volume percent contents of La and Fe in the intermediate alloy powder with an atomic percent composition of $La_{25}Fe_{75}$ are 51 vol. % and 49 vol. %, respectively. This shows that even if b is significantly greater than 50%, the volume percent content of the obtained first-phase particles can still be lower than 50% to ensure that the first-phase particles are distributed in a dispersed manner. Therefore, it is reasonable to determine b=75% as the limit value at which the first-phase particles can be dispersed and precipitated in the second-phase matrix.

Furthermore, when the b value content in the initial alloy with the major ingredient of $A_a(M_xD_y)_bT_d$, $A_aM_bT_d$ or $A_aM_bAl_cT_d$ is high, such as 75%<b≤99.5% or 75%<b≤99.4%, the volume percent content of the first-phase particles with the major ingredients of $(M_xD_y)_{x1}T_{z1}$, $A_{x1}T_{z1}$ or $A_{x1}Al_{y1}T_{z1}$ in an intermediate alloy powder is high during the atomizing solidification process of liquid drops, a large number of precipitated first-phase particles will inevitably undergo a bridge-combination-growth process during the solidification process. In this case, no matter what the cooling rate is, the precipitated first-phase particles in the intermediate alloy powder tend to be wrapped in the second-phase matrix in the form of one merged particle or several merged particles.

Furthermore, when the value of b is extremely high, such as 95%≤b≤99.5% or 95%≤b≤99.4%, the first-phase particle occupies an absolute dominant volume in the intermediate alloy powder, thus the first-phase particle can exist in the intermediate alloy powder in the form of a single particle, and forms a core-shell structure with the second-phase matrix externally wrapping it.

Furthermore, when the value of b is extremely high, such as 95%≤b≤99.5% or 95%≤b≤99.4%, the particle size of the intermediate alloy powder formed through an atomization comminuting process is in a range of 1 μm to 8 mm, the particle size of a single first-phase particle in the intermediate alloy powder is slightly smaller than that of corresponding intermediate alloy powder. For example, when the particle size of the intermediate alloy powder is 100 μm, the particle size of the internal single first-phase particle can be 96 μm.

In step 3,
furthermore, the method for removing the second-phase matrix in the intermediate alloy powders includes at least one of an acid reaction for removal, an alkali reaction for removal, and a vacuum volatilization for removal.

The compositions and concentrations of acid solution and alkali solution are not specifically specified, as long as the removal of the matrix phase can be achieved while the first-phase particles can be maintained.

The temperature and vacuum degree of the vacuum treatment are not specifically limited, as long as the matrix phase can be removed and the first-phase particles can be retained at the same time.

Furthermore, the method for removing the second-phase matrix in the intermediate alloy powders includes a second-phase matrix natural oxidation-powdering peeling removal.

When the matrix phase includes the elements extremely easy to undergo natural oxidation with oxygen, for example, La, or the like, the matrix phase can be separated from the dispersed particle phase through a natural oxidation-powdering process of the matrix phase, and then the first-phase particles with magnetism or the like can be separated from the natural oxides of the second-phase matrix by using other technical methods, such as magnetic selection.

Furthermore, when the average ingredient of the initial alloy melt is the combination (1) of the first step, the major ingredient of the high-purity target powder material is $(M_xD_y)_{x1}T_{z1}$;

Preferably, when the average ingredient of the initial alloy melt is the combination (1) of the first step, the high-purity target powder material with a major ingredient of $(M_xD_y)_{x1}T_{z1}$ does not contain element A.

Preferably, when the average ingredient of the initial alloy melt is the combination (1) of the first step, the ingredient of the high-purity target powder material is $(M_xD_y)_{x1}T_{z1}$;

Furthermore, when the average ingredient of the initial alloy melt is the combination (2) or combination (3) of the first step, the major ingredient of the high-purity target powder material is $M_{x1}T_{z1}$.

Preferably, when the average ingredient of the initial alloy melt is the combination (2) or combination (3) of the first step, the high-purity target powder material with a major ingredient of $M_{x1}T_{z1}$ does not contain element A.

Preferably, when the average ingredient of the initial alloy melt is the combination (2) or combination (3) of the first step, the ingredient of the high-purity target powder material is $M_{x1}T_{z1}$.

Furthermore, when the average ingredient of the initial alloy melt is the combination (4) of the first step, the major ingredient of the high-purity target powder material is $M_{x1}Al_{y1}T_{z1}$.

Preferably, when the average ingredient of the initial alloy melt is the combination (4) of the first step, the high-purity target powder material with a major ingredient of $M_{x1}Al_{y1}T_{z1}$ does not contain element A.

Preferably, when the average ingredient of the initial alloy melt is the combination (4) of the first step, the ingredient of the high-purity target powder material is $M_{x1}Al_{y1}T_{z1}$.

Furthermore, the particle size of the high-purity target powder material is in a range of 3 nm to 7.9 mm;
furthermore, the particle size of the high-purity target powder material is in a range of 3 nm to 3.9 mm;
furthermore, the particle size of the high-purity target powder material is in a range of 3 nm to 0.95 mm;
furthermore, the particle size of the high-purity target powder material is in a range of 3 nm to 245 μm;
furthermore, the particle size of the high-purity target powder material is in a range of 3 nm to 96 μm;
furthermore, the particle size of the high-purity target powder material is in a range of 3 nm to 47 μm;
furthermore, the particle size of the high-purity target powder material is in a range of 3 nm to 18.5 μm;

Furthermore, the shape of the high-purity target powder includes spheroidal shape, sub-spheroidal shape, dendrite shape, rod shape, and strip shape.

The present disclosure further relates to an application of the target power material obtained through the above preparation method in the fields such as catalytic materials, powder metallurgy, composite materials, wave-absorbing materials, sterilization materials, metal injection molding, 3D printing additive manufacturing, and coating.

The present disclosure further relates to a double-phase powder material, wherein the double-phase powder material is powdery, and a single double-phase particle thereof further comprises an endogenous powder and a wrapping body; the solidification structure of the double-phase powder material comprises a matrix phase and a particle phase, the matrix phase is the wrapping body, and the particle phase is the endogenous powder in the double-phase powder material; the melting point of the wrapping body is lower than that of the endogenous powder, and the endogenous powder is wrapped in the wrapping body;

The chemical constitutions and structures of the double-phase powder material comprise any one of the following four combinations:
1) the major ingredient of the endogenous powder in the double-phase powder material is $(M_xD_y)_{x1}T_{z1}$, and the major average ingredient of the wrapping body is $A_{x2}T_{x2}$; 98%≤x1≤100% and 0≤z1≤2%; 70%≤x2≤100% and 0≤z2≤30%; z1≤d≤z2 and 2z1≤z2; x1, z1, x2, and z2 represent the atomic percent contents of corresponding constituent elements respectively; A includes at least one of Y, La, Ce, Pr, Nd, Pm, Sm, Eu, Gd, Th, Dy, Ho, Er, Tm, Yb, and Lu, M includes at least one of W, Cr, Mo, V, Ta, Nb, Zr, Hf, and Ti, and D includes at least one of Fe, Co, and Ni; T includes at least one of O, H, N, P, S, F, Cl, I, and Br; x and y represent the atomic percent contents of corresponding constituent elements respectively, and 5%≤x≤55% and 45%≤y≤95%;

Furthermore, molar ratio x:y=0.9 to 1.1; preferably, x=y=50%, namely the molar ratio x:y=1:1;

Preferably, A is selected from at least one of Y, La, Ce, Pr, Nd, Pm, Sm, Eu, Gd, Th, Dy, Ho, Er, Tm, Yb, and Lu; preferably, M is selected from at least one of W, Cr, Mo, V, Ta, Nb, Zr, Hf, and Ti; preferably, D is selected from at least one of Fe, Co, and Ni;

preferably, 98%≤x1<100% and 0<z1≤2%; 70%≤x2<100% and 0<z2≤30%; z1<d<z2 and 2z1<z2;

preferably, 98.5%≤x1≤100% and 0≤z1≤1.5%; 70%≤x2≤100% and 0≤z2≤30%; z1≤d≤z2 and 2z1≤z2;

preferably, 98.5%≤x1<100% and 0<z1≤1.5%; 70%≤x2<100% and 0<z2≤30%; z1<d<z2 and 2z1<z2;

preferably, 99%≤x1≤100% and 0≤z1≤1%; 70%≤x2≤100% and 0≤z2≤30%; z1≤d≤z2 and 2z1≤z2;

preferably, 99%≤x1<100% and 0<z1≤1%; 70%≤x2<100% and 0<z2≤30%; z1<d<z2 and 2z1<z2;

preferably, the endogenous powder in the double-phase powder material with the major ingredient of $(M_xD_y)_{x1}T_{z1}$ does not contain element A;

preferably, the ingredient of the double-phase powder material is $(M_xD_y)_{x1}T_{z1}$, and the average ingredient of the wrapping is $A_{x2}T_{z2}$;

2) the major ingredient of the endogenous powder in the double-phase powder material is $M_{x1}T_{z1}$, and the major average ingredient of the wrapping body is $A_{x2}T_{z2}$; 98%≤x1≤100% and 0≤z1≤2%; 70%≤x2≤100% and 0≤z2≤30%; z1≤d≤z2 and 2z1≤z2; x1, z1, x2, and z2 represent the atomic percent contents of corresponding constituent elements respectively; A includes at least one of Mg, Ca, Li, Na, K, Cu, Y, La, Ce, Pr, Nd, Pm, Sm, Eu, Gd, Th, Dy, Ho, Er, Tm, Yb, and Lu, and M includes at least one of W, Cr, Mo, V, Ta, Nb, Zr, Hf, and Ti; T includes at least one of O, H, N, P, S, F, Cl, I, and Br;

preferably, when M includes at least one of W, Cr, Mo, V, Ta, Nb, Zr, Hf, and Ti, A includes at least one of Y, La, Ce, Pr, Nd, Pm, Sm, Eu, Gd, Th, Dy, Ho, Er, Tm, Yb, and Lu;

preferably, when M includes at least one of W, Cr, Mo, V, Ta, Nb, Zr, Hf, and Ti, A includes Cu;

preferably, A is selected from at least one of Mg, Ca, Li, Na, K, Cu, Y, La, Ce, Pr, Nd, Pm, Sm, Eu, Gd, Tb, Dy, Ho, Er, Tm, Yb, and Lu; preferably, M is selected from at least one of W, Cr, Mo, V, Ta, Nb, Zr, Hf, and Ti;

preferably, 98%≤x1<100% and 0<z1≤2%; 70%≤x2<100% and 0<z2≤30%; z1<d<z2 and 2z1<z2;

preferably, 98.5%≤x1≤100% and 0≤z1≤1.5%; 70%≤x2≤100% and 0≤z2≤30%; z1≤d≤z2 and 2z1≤z2;

preferably, 98.5%≤x1<100% and 0<z1≤1.5%; 70%≤x2<100% and 0<z2≤30%; z1<d<z2 and 2z1<z2;

preferably, 99%≤x1≤100% and 0≤z1≤1%; 70%≤x2≤100% and 0≤z2≤30%; z1≤d≤z2 and 2z1≤z2;

preferably, 99%≤x1<100% and 0<z1≤1%; 70%≤x2<100% and 0<z2≤30%; z1<d<z2 and 2z1<z2;

preferably, the endogenous powder in the double-phase powder material with the major ingredient of $M_{x1}T_{z1}$ does not contain element A;

preferably, the ingredient of the endogenous powder in the double-phase powder material is $M_{x1}T_{z1}$, and the average ingredient of the wrapping body is $A_{x2}T_{z2}$;

3) the major ingredient of the endogenous powder in the double-phase powder material is $M_{x1}T_{z1}$, and the major average ingredient of the wrapping body is $A_{x2}T_{z2}$; 98%≤x1≤100% and 0≤z1≤2%; 70%≤x2≤100% and 0≤z2≤30%; z1≤d≤z2 and 2z1≤z2; x1, z1, x2, and z2 represent the atomic percent contents of corresponding constituent elements respectively; A includes at least one of Zn, Mg, Sn, Pb, Ga, In, Al, La, Ge, Cu, K, Na, and Li, M includes at least one of Be, B, Bi, Fe, Ni, Cu, Ag, Si, Ge, Cr, and V, and the proportion of the atomic percent contents of Be, B, Si, and Ge in M to M is smaller than 50%; T includes at least one of O, H, N, P, S, F, Cl, I, and Br;

preferably, A includes at least one of Zn, Mg, Sn, Pb, Ga, In, Al, La, Ge, Cu, K, Na, and Li, M includes at least one of Be, B, Bi, Fe, Ni, Cu, Ag, Si, Ge, Cr, and V, and when M includes Fe and Ni, M does not include Cr and V;

preferably, A is selected from at least one of Zn, Mg, Sn, Pb, Ga, In, Al, La, Ge, Cu, K, Na, and Li; preferably, M is selected from at least one of Be, B, Bi, Fe, Ni, Cu, Ag, Si, Ge, Cr, and V, and when M includes Fe and Ni, M does not include Cr and V;

preferably, M includes at least one of Be, B, Bi, Fe, Ni, Cu, Ag, Si, Ge, Cr, and V, and the total atomic percent content of Be, B, Si, and Ge in M to M is smaller than 30%;

preferably, A includes at least one of Zn, Mg, Sn, Pb, Ga, In, Al, La, Ge, Cu, K, Na, and Li; preferably, M includes at least one of Be, Bi, Fe, Ni, Cu, Ag, Cr, and V; T includes at least one of O, H, N, P, S, F, Cl, and Br;

preferably, when M includes B, A includes at least one of Sn, Ge, Cu, and Zn; when M includes Bi, A includes at least one of Sn, Ga, and Al;

preferably, when M includes at least one of Fe, Ni, Cu, and Ag, A includes at least one of La, In, Na, K, Li, Pb, and Mg; preferably, when M includes at least one of Fe and Ni, A includes at least one of La, In, Na, K, Li and Mg; when M includes at least one of Cu and Ag, A includes at least one of Pb, Na, K, and Li;

preferably, when M includes at least one of Si and Ge, A includes at least one of Zn, Sn, Pb, Ga, In, and Al;

preferably, when M includes at least one of Cr and V, A includes Zn;

preferably, 98%≤x1<100% and 0<z1≤2%; 70%≤x2<100% and 0<z2≤30%; z1<d<z2 and 2z1<z2;

preferably, 98.5%≤x1≤100% and 0≤z1≤1.5%; 70%≤x2≤100% and 0≤z2≤30%; z1≤d≤z2 and 2z1≤z2;

preferably, 98.5%≤x1<100% and 0<z1≤1.5%; 70%≤x2<100% and 0<z2≤30%; z1<d<z2 and 2z1<z2;

preferably, 99%≤x1≤100% and 0≤z1≤1%; 70%≤x2≤100% and 0≤z2≤30%; z1≤d≤z2 and 2z1≤z2;

preferably, 99%≤x1<100% and 0<z1≤1%; 70%≤x2<100% and 0<z2≤30%; z1<d<z2 and 2z1<z2;

preferably, the endogenous powder in the double-phase powder material with the major ingredient of $M_{x1}T_{z1}$ does not contain element A;

preferably, the ingredient of the endogenous powder in the double-phase powder material is $M_{x1}T_{z1}$, and the average ingredient of the wrapping body is $A_{x2}T_{z2}$;

4) the major ingredient of the endogenous powder in the double-phase powder material is $M_{x1}Al_{y1}T_{z1}$, and the major average ingredient of the wrapping body is $A_{x2}Al_{y2}T_{z2}$; 78%≤x1≤99.9%, 0.1%≤y1≤22% and 0≤z1≤2%; 70%≤x2≤99.8%, 0.2%≤y2≤30%, and 0≤z2≤30%, z1≤d≤z2, 2z1≤z2, y1<y2; and x1, y1, z1, x2, y2, and z2 represent the atomic percent contents of corresponding constituent elements respectively; A includes at least one of Y, La, Ce, Pr, Nd, Pm, Sm, Eu, Gd, Tb, Dy, Ho, Er, Tm, Yb, and Lu; M includes at least one of W, Cr, Mo, V, Ta, Nb, Zr, Hf, and Ti; Al is aluminum; and T includes at least one of O, H, N, P, S, F, Cl, I, and Br;

preferably, A is selected from at least one of Y, La, Ce, Pr, Nd, Pm, Sm, Eu, Gd, Tb, Dy, Ho, Er, Tm, Yb, and Lu; preferably, M is selected from at least one of W, Cr, Mo, V, Ta, Nb, Zr, Hf, and Ti;

preferably, 78%≤x1≤99.8%, 0.1%≤y1≤21.9% and 0<z1≤2%; 70%≤x2≤99.7%, 0.2%≤y2≤29.9%, 0<z2≤30%, z1<d<z2, and 2z1≤z2;

preferably, 78%≤x1≤99.9%, 0.1%≤y1≤22% and 0≤z1≤1.5%; 70%≤x2≤99.8%, 0.2%≤y2≤30%, 0≤z2≤30%, z1≤d≤z2, and 2z1≤z2;

preferably, 78%≤x1≤99.8%, 0.1%≤y1≤21.9% and 0<z1≤1.5%; 70%≤x2≤99.7%, 0.2%≤y2≤29.9%, 0<z2≤30%, z1<d<z2, and 2z1<z2;

preferably, 78%≤x1≤99.9%, 0.1%≤y1≤22% and 0≤z1≤1%; 70%≤x2≤99.8%, 0.2%≤y2≤30%, 0≤z2≤30%, z1≤d≤z2, and 2z1≤z2;

preferably, 78%≤x1≤99.8%, 0.1%≤y1≤21.9% and 0<z1≤1%; 70%≤x2≤99.7%, 0.2%≤y2≤29.9%, 0<z2≤30%, z1<d<z2, and 2z1<z2;

preferably, y1<y2;

preferably, the endogenous powder in the double-phase powder material with the major ingredient of $M_{x1}Al_{y1}T_{z1}$ does not contain element A;

preferably, the ingredient of the endogenous powder in the double-phase powder material is $M_{x1}Al_{y1}T_{z1}$, and the average ingredient of the wrapping body is $A_{x2}Al_{y2}T_{z2}$;

preferably, the chemical composition and structure of the double-phase powder material is any one of the four combinations 1) to 4);

furthermore, the double-phase powder material does not contain the intermetallic compound composed of A and M;

furthermore, the double-phase powder material does not contain the intermetallic compound composed of A and D;

furthermore, the particle shape of the double-phase powder material includes spheroidal shape, sub-spheroidal shape, drop shape, dumbbell shape, and irregular rod or ribbon shape.

Furthermore, the particle size of the double-phase powder material is in a range of 1 μm to 8 mm; preferably, the particle size of the double-phase powder material is in a range of 1 μm to 4 mm; preferably, the particle size of the double-phase powder material is in a range of 1 μm to 1 mm; preferably, the particle size of the double-phase powder material is in a range of 1 μm to 250 μm; preferably, the particle size of the double-phase powder material is in a range of 1 μm to 100 μm; preferably, the particle size of the double-phase powder material is in a range of 1 μm to 50 μm; preferably, the particle size of the double-phase powder material is in a range of 1 μm to 20 μm;

furthermore, the structure in which the endogenous powder in the double-phase powder material is wrapped in the wrapping body includes: a mosaic structure in which a plurality of the endogenous powder is distributed in the wrapping body in a dispersed manner, or a core-shell structure in which a single endogenous powder is inside and the wrapping body is outside;

furthermore, the particle size of the endogenous powder in the double-phase powder material is in a range of 3 nm to 7.9 mm; preferably, the particle size of the endogenous powder in the double-phase powder material is in a range of 3 nm to 3.9 mm; preferably, the particle size of the endogenous powder in the double-phase powder material is in a range of 3 nm to 0.95 mm; preferably, the particle size of the endogenous powder in the double-phase powder material is in a range of 3 nm to 245 μm; preferably, the particle size of the endogenous powder in the double-phase powder material is in a range of 3 nm to 96 μm; preferably, the particle size of the endogenous powder in the double-phase powder material is in a range of 3 nm to 47 μm; preferably, the particle size of the endogenous powder in the double-phase powder material is in a range of 3 nm to 18.5 μm;

furthermore, the double-phase powder material is prepared through the step 1 and the step 2 in the method for preparing a high-purity powder material;

furthermore, the volume percent content of the endogenous powders in the double-phase powder material is in a range of 0.5% to 99.5%;

furthermore, when the double-phase powder material is prepared through the step 1 and the step 2 in the present method for preparing the high-purity powder material, the specific volume percent content of the endogenous powder in the double-phase powder material can be determined according to the average ingredient of the intermediate alloy powder in a combination of the ingredients of the endogenous powder and the wrapping body in the intermediate alloy powder, as well as the atomic weight and density of each element, and can also be obtained through calculation of these data.

It should be noted that A, M, D, or T in the solutions of the present disclosure may also include other elements or impurity elements than those listed above. As long as the introduction of or the change of content of these elements does not bring an "essential" result to the solidification process and the law of the initial alloy, no impact will be caused to the implementation of the above technical solutions of the present disclosure.

Specifically, the result that the solidification process and the law of the initial alloy do not undergo "essential change" means that when the A, M, D, and T include other elements or impurity elements than those listed above, the factual processes and laws listed in 1)-3) below still exist:

1) The intermediate alloy powder does not contain an intermetallic compound mainly composed of A and M or A and D;
2) The solidification structure of the intermediate alloy powder includes a second-phase matrix and a first-phase particle, the melting point of the second-phase matrix is lower than that of the first-phase particle, and the first-phase particle is wrapped in the second-phase matrix;
3) When the T impurity content of the initial alloy melt is not 0, the T impurity content of the first-phase particles in the intermediate alloy powders is lower than that of the initial alloy melt, and two times the T impurity content of the first-phase particles is still lower than the T impurity content of the second-phase matrix.

The technical solutions of the present disclosure have the following beneficial effects.

firstly, through the "atomization comminuting process+de-phasing method", the preparation of nano-level, sub-micron-level, micro-level, and even millimeter-level spheroidal powder materials can be realized, which is extremely creative.

In the step 2 of the present disclosure, preparation of the target powder material is realized through the following two mechanisms: the first mechanism is based on the basic principle of atomization comminuting process, to crush an alloy melt into fine liquid drops through the impact of fast-moving fluid (atomizing medium), and then condensate the fine liquid drops into intermediate alloy powders with certain particle size; the second mechanism is to further obtain smaller precipitated first-phase particles within the second-phase matrix of the intermediate alloy powders during the solidification process of the atomized liquid drops. When the solidification rate of the liquid drops is sufficiently high and the volume percent content of the first-phase particles in the intermediate alloy powders is low, the particle size of the precipitated first-phase particles in the intermediate alloy powders can reach a nano-level. Therefore, the present disclosure, based on the principles that the atomizing medium crush the melt and much finer first-phase particles can precipitate within the second-phase matrix of the intermediate alloy powders, properly solves the technical problem that currently ultrafine powder material is difficult to obtain through atomization comminuting process, thus greatly reducing the preparation cost of the ultrafine powder material. However, the statistical $D_{50}$ value of the particle size of the powder particles prepared by traditional "atomization comminuting process" technology is difficult to be less than 5 μm, and it is also unable to prepare nanometer powder particles by the traditional "atomization pulverization" technology. On the other hand, by using the simple "de-phasing method" and controlling the cooling rate of the alloy melt, although the endogenous first-phase particles with a particle size ranging from nano-level scale to millimeter-level scale can be obtained, the simple "de-phasing method" consists of the following processes: an alloy ribbon is prepared by such a method as melt spinning, and then the second-matrix-phase in the alloy ribbon is removed, thus the powder material composed of the first-phase particles separated from the alloy ribbon can be obtained. In this way, although the nano-scale first-phase particle is generally spherical when the first-phase particle size is large, such as micron size, the first-phase particles mainly precipitate in the form of large dendritic particles. Therefore, generally, only micron-sized dendritic first-phase particles can be prepared by the ordinary "de-phasing method", while micron-sized spheroidal first-phase particles are difficult to be prepared. If the spherical micron-sized particles are the target products, it is necessary to spheroidize the dendritic first-phase particles through other methods, such as plasma spheroidization, which greatly increases the cost. For the "atomization comminuting process+de-phasing method" of the present disclosure, this problem is well solved. Specifically, if the micron-level spheroidal powder is the target product, the volume percentage of the first-phase particles in the intermediate alloy powder can be greatly increased by taking a high value of b, thus spherical intermediate alloy powder with a core-shell structure in which a single first-phase particle is wrapped by the second-phase matrix can be obtained, and then the spherical powder material mainly composed of the first-phase particles can be obtained by removing the second-phase matrix shell. Moreover, by using a high value of b and increasing the volume percent content of the first-phase particles in the intermediate alloy powders, the volume and amount of the wrapping second-phase matrix that needs to be removed later can be greatly reduced, thereby reducing the production cost. Therefore, the present disclosure skillfully combines the principle of atomization comminuting process with the "de-phasing method". The present disclosure can control the size and morphology of the first-phase particles in the intermediate alloy powders, and control the distribution characteristic (dispersed mosaic structure or core-shell structure) of the first-phase particles in the intermediate alloy powders by controlling the work (crushing) parameters of the atomizing medium, the cooling rate of atomized liquid drops and the value of b of the initial alloy (melt). By further removing the second-phase matrix in different intermediate alloy powders, nano-level, sub-micron-level, micron-level, and even millimeter-level spheroidal high-purity powder materials can be prepared respectively.

Secondly, by skillful alloy design, phase separation occurs during the solidification of the initial alloy melt, thus endogenous particles with a certain particle size and target ingredient can be formed during the solidification process of the initial alloy melt and separated during a subsequent removal process. Generally speaking, nano-metal powders can be easily prepared by bottom-up chemical methods, such as chemical reduction, however, it is difficult to prepare nano-metal powders when the particle size increases to hundreds of nanometers or even micron-level by chemical methods. Through top-down physical methods, such as the atomization comminuting process and ball milling method, it is relatively easy to prepare metal particles of tens of microns or hundreds of microns, however, metal particles are difficult to be prepared when the particle size is reduced to a range of hundreds of nanometers to several microns. The technical solution of the present disclosure can easily prepare nano-level, sub-micron-level, micron, or even millimeter-level target powder materials by controlling the different cooling rates during the solidification process of the intermediate alloy powders and making full use of the mechanism of the atomization comminuting process, which breaks through the aforementioned technical difficulties and has great advantages.

Thirdly, the target high-purity powder material can be prepared from low-purity raw materials, which proposes a new way to prepare high-purity powder material from low-purity raw materials, thereby greatly reducing costs and bringing great significance. In the present disclosure, the purity of the target high-purity powder material is improved mainly by the following mechanisms: 1) Major matrix element with high activity (such as rare earth element RE) has an absorption effect on impurity elements of the initial alloy melt. There is a strong affinity between the matrix element and the impurity element T since the matrix element is usually of high activity and low melting point. In this case, the impurity element T in the initial alloy melt may either enter, in a larger amount, the second-phase matrix or form molten slags with the major matrix phase element in a molten state and separated from the alloy melt. 2) The impurity element T is drained into the remaining melt during a nucleation growth process of the target powder material (endogenously precipitated first-phase particle). As long as the endogenous first-phase particles precipitate earlier than the solidification of the second-phase matrix during the solidification of the intermediate alloy powders, the impurity element T will be enriched in the last solidified melt, that is, a portion of melt which is mainly composed of the major matrix phase elements and solidified into the second-phase matrix. 3) due to the existence of a second-phase matrix, the crucible will interact with the melt during the melting process, thus the crucible-related impurities will enter the melt and be enriched in the second-phase matrix, so that the quality requirements for the crucibles in the melting process are further reduced, greatly reducing the production costs. 4) as the first-phase particles are wrapped by the second-phase matrix, gas impurities introduced through the atmosphere are absorbed by the matrix during the atomizing solidification process and difficult to enter the first-phase particles, further protecting the first-phase particles. Therefore, due to the skillful design and introduction of the second-phase matrix, during the preparation process of the intermediate alloy powders, even if non-high-purity raw materials and ordinary crucibles are used, or other impurity elements enter the melt during the melting process and atomization powder spraying process, the first-phase particles with a low impurity content can be obtained, and the production cost of the target high-purity powder material is greatly reduced. For example, high-purity target metal powder materials (such as high-purity Ti powder) can be prepared from low-purity raw materials (such as sponge Ti).

Fourthly, the intermediate alloy powder is composed of the first-phase particles wrapped by the second-phase matrix. During the atomizing solidification process of the intermediate alloy powders, according to the theory of alloy solidification and precipitation, the first-phase particles in the atomized liquid drops are liable to be precipitated and grow in the melt in a spheroidal shape, sub-spheroidal shape or dendrite shape. Wrapped by the second-phase matrix, the first-phase particles have a smoother outer surface than the intermediate alloy powders. In particular, when the value of b in the initial alloy of $A_a(M_xD_y)_bT_d$, $A_aM_bT_d$, or $A_aM_bAl_cT_d$ is lower, the first-phase particles are uniformly distributed in the second-phase matrix in a dispersed manner. In this case, even if the shape of the prepared intermediate alloy powder is extremely irregular and the surface smoothness is extremely poor, which will not prevent the smaller first-phase particles dispersed and precipitated in the intermediate alloy powders from obtaining higher sphericity and surface smoothness. Therefore, the target powder material with high surface quality can be obtained by removing the matrix phase.

Fifthly, for the double-phase powder material composed of the endogenous powder and the wrapping body, an in-situ generated matrix phase creatively wraps the endogenous powder, thus keeping the high purity and high activity of the endogenous powder. Specifically, the metal or alloy powders prepared by a traditional chemical method or physical method, especially nano-powders with an extremely large specific surface area, are easily oxidized naturally and thus the difficulty of powder storage has to be faced. In view of this problem, after the double-phase powder material composed of an endogenous powder and a wrapping body (the matrix phase) is prepared in the technical solution of the present disclosure, the wrapping body is not removed immediately, but directly used to protect the endogenous powder from being naturally oxidized. The double-phase powder material composed of the endogenous powder and the wrapping body can be directly used as a raw material for downstream production. Therefore, it has the potential to become one special product. When a high-purity powder is needed for the downstream production, based on characteristics of a next working procedure, the endogenous powders are released from the wrapping body of the double-phase power materials in a proper environment at a proper time, and then fed into the next production process in a possible short time, thereby greatly reducing the possibility that the endogenous powders are contaminated by oxygen and other impurities. For example, when the endogenous metal powders are nano-scale powders, the endogenous powders are composited with resin while being released from the wrapping body or immediately thereafter, so as to prepare a resin-based composite material added with highly active endogenous powders.

Sixthly, when M in the initial alloy melt of $A_a(M_xD_y)_bT_d$, $A_aM_bT_d$ or $A_aM_bAl_cT_d$ is a combination of multiple elements which meet the selection conditions of M, the first-phase particles in the obtained intermediate alloy powder is also composed of multiple elements, which makes it easier and feasible to prepare the target alloy powder material composed of the first-phase particles, and greatly expands the composition range and application field of the target alloy powder material.

Therefore, the preparation method of the present disclosure adopts the combination of "atomization comminuting process+de-phasing method", which has the advantages of simple process, easy operation, and low costs, and thus can be used to prepare multiple high-purity powder materials of nano-level, sub-micron-level, and micron-level. Therefore, the high-purity powder material has good application prospects in the fields such as catalytic materials, powder metallurgy, composite materials, wave-absorbing materials, sterilization materials, metal injection molding, 3D printing additive manufacturing, and coating.

In addition, when the target powder is mainly composed of non-metallic elements, the present disclosure further relates to a method for preparing a high-purity powder material, including the following steps:

at step 1, selecting initial alloy raw materials, melting the initial alloy raw materials based on an ingredient ratio of the initial alloy to obtain a homogeneous initial alloy melt;

at step 2, atomizing and solidifying the initial alloy melt through an atomization comminuting process, to obtain an intermediate alloy powder; wherein the intermediate alloy powder includes a first phase and a second phase, the first phase is granular, the second phase is a matrix phase with a melting point lower than that of the first phase, and the first-phase particle is wrapped in the second-phase matrix; during the atomization comminuting process, impurity elements in the initial alloy melt and introduced during an atomizing solidification process are enriched in the second-phase matrix, so that the first-phase particles are purified;

at step 3, removing the second-phase matrix in the intermediate alloy powder, and retaining the first-phase particles, wherein the impurity elements enriched in the second-phase matrix are removed together with the second-phase matrix, so that a high-purity target power material composed of the first-phase particles is obtained;

wherein the impurity element in the initial alloy melt is T, and T includes at least one of O, H, N, P, S, F, Cl, I, and Br.

The major average ingredient of the initial alloy melt is $A_aM_bT_d$, A includes at least one of Zn, Sn, Pb, Ga, In, Al, Ge, and Cu; M includes at least one of Be, Si, Ge, and B, and the proportion of the atomic percent contents of Be, Si, Ge, and B in M is greater than or equal to 50%, a, b, and c represent the atomic percent contents of corresponding constituent elements respectively, and $0.5\% \leq a \leq 99.5\%$, $0.5\% \leq b \leq 99.5\%$ and $0 \leq d \leq 10\%$;

preferably, M includes at least one of Be, Si, Ge, and B, and the proportion of the atomic percent contents of Be, Si, Ge, and B in M is greater than or equal to 70%;

preferably, 0.5%≤a≤99.4%, 0.5%≤b≤99.4% and 0<d≤10%; preferably, 1%≤a≤99%, 1%≤b≤99% and 0≤d≤10%; preferably, 1%≤a≤98.9%, 1%≤b≤98.9% and 0<d≤10%; preferably, 2%≤a≤98%, 2%≤b≤98% and 0≤d≤10%; preferably, 2%≤a≤97.9%, 2%≤b≤97.9% and 0<d≤10%;

furthermore, the major average ingredient of the initial alloy melt is $A_aM_bT_d$, and when M includes at least one of Be, Si, and Ge, A includes at least one of Zn, Sn, Pb, Ga, In, and Al; and when M includes B, A includes at least one of Sn, Ge, Cu, and Zn;

the initial alloy powder comprises the first-phase particles with the major ingredient of $M_{x1}T_{z1}$ and the second-phase matrix with the major ingredient of $A_{x2}T_{z2}$; 98%≤x1≤100% and 0≤z1≤2%; 70%≤x2≤100% and 0≤z2≤30%; z1≤d≤z2 and 2z1≤z2; x1, and z1, x2, and z2 represent the atomic percent contents of corresponding constituent elements respectively;

preferably, 98%≤x1<100% and 0<z1≤2%; 70%≤x2<100% and 0<z2≤30%; z1<d<z2 and 2z1<z2; preferably, 98.5%≤x1≤100% and 0≤z1≤1.5%; 70%≤x2≤100% and 0≤z2≤30%; preferably, 98.5%≤x1<100% and 0<z1≤1.5%; 70%≤x2<100% and 0<z2≤30%; preferably, 99%≤x1≤100% and 0≤z1≤1%; 70%≤x2≤100% and 0≤z2≤30%; preferably, 99%≤x1<100% and 0<z1≤1%; 70%≤x2<100% and 0<z2≤30%;

furthermore, the first-phase particles with the major ingredient of $M_{x1}T_{z1}$ do not contain element A;

furthermore, the ingredient of the first-phase particles is $M_{x1}T_{z1}$;

furthermore, during the atomization comminuting process, the impurity elements in the initial alloy melt are enriched in the second-phase matrix, thereby ensuring the first-phase particles are purified;

furthermore, the atomization comminuting process includes at least one of gas atomization, water atomization, water and gas combined atomization, vacuum atomization, plasma atomization, centrifugal atomization, rotating disk atomization, and rotating electrode atomization.

Furthermore, the particle shape of the intermediate alloy powder includes spheroidal shape, sub-spheroidal shape, drop shape, dumbbell shape, and irregular rod or ribbon shape.

By adjusting the atomization parameter, the initial alloy melt can be disintegrated into liquid drops with different particle sizes through an atomization comminuting process, and the liquid drops can be further solidified into intermediate alloy powder with different particle sizes. When the atomizing medium energy is high enough, intermediate alloy powder with small particle sizes can be obtained, and the solidification rate of the intermediate alloy powder is relatively high; when the atomizing medium energy is low, intermediate alloy powder with large particle sizes can be obtained, and the solidification rate of the intermediate alloy powder is relatively low.

Furthermore, the particle size of the intermediate alloy powder is in a range of 1 μm to 8 mm; furthermore, the particle size of the intermediate alloy powder is in a range of 1 μm to 4 mm; furthermore, the particle size of the intermediate alloy powder is in a range of 1 μm to 1 mm; furthermore, the particle size of the intermediate alloy powder is in a range of 1 μm to 250 μm; furthermore, the particle size of the intermediate alloy powder is in a range of 1 μm to 100 μm; furthermore, the particle size of the intermediate alloy powder is in a range of 1 μm to 50 μm; furthermore, the particle size of the intermediate alloy powder is in a range of 1 μm to 20 μm;

furthermore, the particle size of the first-phase particles in the intermediate alloy powder is related to the atomizing solidification rate of the initial alloy melt; generally, the particle size of the first-phase particles in the intermediate alloy powder is in negative correlation with the atomizing solidification rate of the initial alloy melt; namely, the higher the atomizing solidification rate of the initial alloy melt, the smaller the particle size of the first-phase particles in the intermediate alloy powders.

Furthermore, when the atomizing solidification rate of the initial alloy melt is $10^3$K/s-$10^6$K/s, the intermediate alloy powders with a size of mainly micron-scale can be obtained.

Furthermore, when the atomizing solidification rate of the initial alloy melt is 50K/s-$10^3$K/s, the intermediate alloy powders with a size of mainly several hundred-micron scale or millimeter-level scale can be obtained.

Furthermore, the volume fraction of the first-phase particles in the intermediate alloy powder is controlled by the contents of A and M in the intermediate alloy powder; generally, the atomic percent content of M in the intermediate alloy powder is 0.5%≤b≤99.5% or 0.5%≤b≤99.4%, thus the volume fraction of the first-phase particles with a major average ingredient of M is also approximately close to the same ratio, and the specific value can be obtained through calculation according to the atomic weight and the density of each element.

Furthermore, the volume percent content of the first-phase particles in the intermediate alloy powders is in a range of 0.5% to 99.5%;

furthermore, the accurate value of the volume fraction of the first-phase particles in the intermediate alloy powder can be confined according to the average ingredient of the intermediate alloy powder, the ingredients of the first phase and the second phase, in combination with the atomic weight and density of each element, and can also be calculated according to these parameters.

Furthermore, the structure in which the first-phase particle is wrapped in the second-phase matrix includes: a mosaic structure in which a plurality of the first-phase particles are distributed in the second-phase matrix in a dispersed manner, or a core-shell structure in which a single first-phase particle is inside and the second-phase matrix is outside;

Furthermore, the particle size of the first-phase particles in the intermediate alloy powder is in a range of 3 nm to 7.9 mm;

furthermore, the particle size of the first-phase particles in the intermediate alloy powder is in a range of 3 nm to 3.9 mm;

furthermore, the particle size of the first-phase particles in the intermediate alloy powder is in a range of 3 nm to 0.95 mm;

furthermore, the particle size of the first-phase particles in the intermediate alloy powder is in a range of 3 nm to 245 μm;

furthermore, the particle size of the first-phase particles in the intermediate alloy powder is in a range of 3 nm to 96 μm;

furthermore, the particle size of the first-phase particles in the intermediate alloy powder is in a range of 3 nm to 47 μm;

furthermore, the particle size of the first-phase particles in the intermediate alloy powder is in a range of 3 nm to 18.5 μm;

furthermore, the method for removing the second-phase matrix in the intermediate alloy powder includes at least one of an acid reaction for removal, an alkali reaction for removal, and a vacuum volatilization for removal.

The compositions and concentrations of acid solution and alkali solution are not specifically specified, as long as the removal of the matrix phase can be achieved while the first-phase particles can be maintained.

The temperature and vacuum degree of the vacuum treatment are not specifically limited, as long as the matrix phase can be removed and the first-phase particles can be retained at the same time.

Preferably, the high-purity target powder material with the major ingredient of $M_{x1}T_{z1}$ does not contain element A.

Preferably, the ingredient of the high-purity target powder material is $M_{x1}T_{z1}$.

Furthermore, the particle size of high-purity target powder material is in a range of 3 nm to 7.9 mm; furthermore, the particle size of the high-purity target powder material is in a range of 3 nm to 3.9 mm; furthermore, the particle size of the high-purity target powder material is in a range of 3 nm to 0.95 mm; furthermore, the particle size of the high-purity target powder material is in a range of 3 nm to 245 μm; furthermore, the particle size of the high-purity target powder material is in a range of 3 nm to 96 μm; furthermore, the particle size of the high-purity target powder material is in a range of 3 nm to 47 μm; furthermore, the particle size of the high-purity target powder material is in a range of 3 nm to 18.5 μm;

furthermore, the shape of the high-purity target powder includes spheroidal shape, sub-spheroidal shape, dendrite shape, rod shape, and strip shape.

As an alternative solution, the present disclosure further provides a method for preparing a high-purity metal powder material, including the following steps:

at step 1, selecting initial alloy raw materials and melting the initial alloy raw materials based on an ingredient ratio of the initial alloy to obtain a homogeneous initial alloy melt;

at step 2, atomizing and solidifying the initial alloy melt through an atomization comminuting process to obtain an intermediate alloy powder; wherein the intermediate alloy powder includes a first phase and a second phase, the first phase is granular, the second phase is a matrix phase with a melting point lower than that of the first phase, and the first-phase particle is wrapped in the second-phase matrix; wherein during the atomization comminuting process, impurity elements in the initial alloy melt and introduced during an atomizing solidification process are enriched in the second-phase matrix such that the first-phase particles are purified;

at step 3, removing the second-phase matrix in the intermediate alloy powder, and retaining the first-phase particles, wherein the impurity elements enriched in the second-phase matrix are removed together with the second-phase matrix such that a high-purity target metal power material composed of the first-phase particles is obtained.

Through the aforementioned "atomization comminuting process+de-phasing method", the preparation of ultrafine metal powders with low impurity content can be realized. In terms of obtaining fine powders, here primary refinement can be achieved through the preparation of intermediate alloy powders by an atomization comminuting process. At the same time, multiple ultrafine first-phase particles, including nano-level first-phase particles, can be further obtained through the formation of the first-phase particles in the intermediate alloy powders. By further removing the second-phase matrix, an ultrafine target metal powder can be obtained, thus the preparation cost of the ultrafine metal powder material can be greatly reduced. In terms of impurity control, due to the introduction of the second-phase matrix, the impurity elements are enriched in the second-phase matrix during the processes of alloy smelting and atomization comminuting process, so that the first-phase particles are purified and protected, and the production cost of the high-purify metal powders are further reduced.

In step 1,
The initial alloy raw material is selected according to the ingredient ratio of the initial alloy, and the initial alloy raw material can be an elemental metal or an intermediate alloy. The initial alloy raw material ensures that the melt is completely homogenized during the melting process, so as to facilitate the smooth progress of the subsequent atomization comminuting process.

In step 2,
when the ingredient ratio of the initial alloy is $A_aM_b$, A is selected from at least one of Mg, Ca, Li, Na, K, Zn, In, Sn, Pb, Ga, Cu, Y, La, Ce, Pr, Nd, Pm, Sm, Eu, Gd, Th, Dy, Ho, Er, Tm, Yb, and Lu, and M is selected from at least one of W, Cr, Mo, V, Ta, Nb, Zr, Hf, Ti, Fe, Co, Ni, Mn, Cu, Ag, Si, Ge, B, Be, and C; a and b represent the atomic percent contents of corresponding constituent elements respectively, and 0.5%≤b≤98% and a+b=100%; the $A_aM_b$ alloy melt does not form an intermetallic compound composed of A and M during atomizing solidification, but forms first-phase particles with the ingredient of M and a second-phase matrix with the ingredient of A. Preferably, A is selected from at least one of Mg, Ca, Li, Na, K, Zn, Pb, Sn, Y, La, Ce, Pr, Nd, Pm, Sm, Eu, Gd, Th, Dy, Ho, Er, Tm, Yb, and Lu, M is selected from at least one of W, Cr, Mo, V, Ta, Nb, Zr, Hf, Ti, Fe, Co, Ni, Cu, Ag, Si, and Ge; preferably, 40%<b≤98%; preferably, 45%<b≤98%.

When the ingredient ratio of the initial alloy is $A_aM_bAl_c$, A is selected from at least one of Mg, Ca, Li, Na, K, Zn, In, Sn, Pb, Ga, Y, La, Ce, Pr, Nd, Pm, Sm, Eu, Gd, Th, Dy, Ho, Er, Tm, Yb, and Lu, Al is aluminum, and M is selected from at least one of W, Cr, Mo, V, Ta, Nb, Zr, Hf, Ti, Fe, Co, Ni, Mn, Cu, Ag, Si, Ge, B, Be, and C; a, b and c represent the atomic percent contents of corresponding constituent elements respectively, and 0.5%≤b≤98%, 0.1%≤c≤30% and a+b+c=100%; the $A_aM_bAl_c$ alloy melt does not form an intermetallic compound composed of A and M during atomizing solidification, but forms first-phase particles with the ingredient of $M_{x1}Al_{y1}$ and a second-phase matrix with the ingredient of $A_{x2}Al_{y2}$, x1, y1, x2, and y2 represent the atomic percent contents of corresponding constituent elements respectively, and 0.1%≤y1≤25%, 0.1%≤y2≤35%, x1+y1=100% and x2+y2=100%. Preferably, A is selected from at least one of Y, La, Ce, Pr, Nd, Pm, Sm, Eu, Gd, Th, Dy, Ho, Er, Tm, Yb and Lu, M is selected from at least one of W, Cr, Mo, V, Ta, Nb, Zr, Hf, Ti, Fe, Co and Ni; preferably, 35%<b≤98%; preferably, 40%<b≤98%.

Furthermore, the atomization comminuting process includes at least one of gas atomization, water atomization, water and gas combined atomization, vacuum atomization, plasma atomization, centrifugal atomization, rotating disk atomization, rotating electrode atomization, and ultrasonic atomization.

Furthermore, the particle size of the intermediate alloy power is in a range of 1 μm to 8 mm; the particle shape of the intermediate alloy powder includes spheroidal shape, sub-spheroidal shape, drop shape, dumbbell shape, and irregular rod or ribbon shape.

Furthermore, the volume fraction of the first-phase particles in the intermediate alloy power is in a range of 0.5% to 98%.

Furthermore, the structure in which the first-phase particle is wrapped in the second-phase matrix includes: a core-shell structure in which a single first-phase particle is inside and the second-phase matrix is outside, or a mosaic structure in which a plurality of the first-phase particles are distributed in the second-phase matrix in a dispersed manner.

Furthermore, the impurity elements in the initial alloy melt and introduced during the atomizing solidification process include at least one of H, O, N, S, P, F, Cl, I, and Br. Wherein, the impurity elements in the initial alloy melt are from the initial alloy raw material, or introduced by the crucible or atmosphere in contact with the melt during the smelting process; the impurities introduced during the atomizing solidification process are mainly introduced by the atomizing atmosphere or the atomizing medium.

In step 3,

The method for removing the second-phase matrix in the intermediate alloy powder includes at least one of an acid reaction for removal, an alkali reaction for removal, and a vacuum volatilization for removal.

Furthermore, the method for removing the second-phase matrix in the intermediate alloy powder includes the second-phase matrix natural oxidation-powdering peeling removal.

Furthermore, the particle size of the high-purity target metal powder material composed of the first-phase particles is in a range of 3 nm to 300 μm; the shape of the high-purity target metal powder includes spheroidal shape, sub-spheroidal shape, dendrite shape, rod shape, and strip shape.

Furthermore, the target metal powder material is graded and sieved according to different particle sizes, to obtain a target metal powder material with a narrower particle size range.

Furthermore, the total contents of H, O, N, S, P, F, Cl, I, and Br in the high-purity target metal powder material are lower than 2000 ppm.

The technical characteristics of the aforementioned alternative disclosures are further described in detail below:

Firstly, in step 2 of the present disclosure, finer first-phase particles are obtained through the following two mechanisms: the first mechanism is based on the basic principle of atomization comminuting process, to crush an alloy melt into fine liquid drops through the impact of a rapidly moving fluid (atomizing medium), and then solidify the fine liquid drops into intermediate alloy powders with certain particle size; the second mechanism is to further obtain smaller first-phase particles through the precipitation of the first-phase particles within the second-phase matrix during the solidification of atomized liquid drops. Therefore, the present disclosure, based on the principle that the atomizing medium crushes the melt and the principle that the first-phase particles are precipitated within the second-phase matrix, properly solves the technical problem that currently ultrafine powder material is difficult to obtain through atomizing crushing, and can greatly reduce the preparation cost of the ultrafine powder material. Specifically, when the value of b in an initial alloy $A_aM_b$ or $A_aM_bAl_c$ is low, such as 0.5%≤b≤50%, the content of the second-phase matrix with a major ingredient of A or $A_{x2}Al_{y2}$ is high during the solidification of atomized liquid drops. Since the solidification process of atomized liquid drops generally corresponds to a high melt cooling rate, when the content of the second matrix phase is high, a large number of the first-phase particles are easy to precipitate within the second-phase matrix. For example, when the cooling rate of atomized liquid drops is higher than $10^3$K/s and the particle size of the corresponding intermediate alloy powders is in a range of 1 μm to 100 μm, the first-phase particles do not have enough time to fully grow and can mainly form nano-level (such as 3 nm to 100 nm) or sub-micron-level (such as 100 nm to 1 μm) first-phase particles; when the cooling rate of the atomized liquid drops is lower than $10^3$K/s and the particle size of the corresponding intermediate alloy powders is in a range of 100 μm to 8 mm, the first-phase particles can fully grow and can mainly form sub-micron-level (100 nm to 1 μm) or micron-level first-phase particles. When the b value content in the initial alloy $A_aM_b$ or $A_aM_bAl_c$ is high, such as 70%≤b≤98%, the content of the first-phase particles with a major ingredient of M and $M_{x1}Al_{y1}$ is high during the solidification of atomized liquid drops. As a large number of first-phase particles simultaneously precipitated during the solidification process, it can inevitably form bridging-merging-growing, at this time, no matter what the cooling rate is, the first-phase particles in the intermediate alloy powder is easily wrapped in the second-phase matrix in the form of one or several particles after precipitation. Particularly, when the value b is extremely high, such as 90%≤b≤98%, the first-phase particle occupies an absolute dominant volume in the intermediate alloy powder, and the first-phase particle can exist in the intermediate alloy powder in the form of a single particle, which forms a core-shell structure with the second-phase matrix externally wrapping the single particle. Because the intermediate alloy powder with a particle size range of 1 μm to 300 μm can be prepared through the existing atomization comminuting process, when the value b is extremely high, the present disclosure can further prepare an intermediate alloy powder with a particle size range equivalent to the intermediate alloy powder with the particle size range of 1 μm to 300 μm through the atomization comminuting process, and the single first-phase particle is only slightly smaller than the intermediate alloy powder. Therefore, the present disclosure can control the size of the first-phase particles in the intermediate alloy powder and the distribution characteristic (dispersed mosaic structure or core-shell structure) of the first-phase particles in the intermediate alloy powder by controlling the work (crushing) parameters of the atomizing medium, the cooling rate of atomized liquid drops and the b value of the initial alloy. By further removing the second-phase matrix in different intermediate alloy powders, nano-level, sub-micron-level, and micron-level metal powder can be prepared respectively.

Secondly, the intermediate alloy powder is composed of the first-phase particles wrapped by the second-phase matrix. During the atomizing solidification process of the intermediate alloy powder, according to the theory of alloy solidification and precipitation, the first-phase particles in the atomized liquid drops are liable to be precipitated and grow in the melt in a spheroidal shape, sub-spheroidal shape, or dendrite shape. Wrapped by the second-phase matrix, the first-phase particles have a smoother outer surface than the intermediate alloy powder. In particular, when the value of b in the initial alloy of $A_aM_b$ or $A_aM_bAl_c$ is low, such as 0.5%≤b≤50%, a large number of first-phase particles are distributed in the second-phase matrix in a dispersed manner. In this case, even if the shape of the prepared intermediate alloy powder is extremely irregular and the surface smoothness is extremely poor, which will not prevent the smaller first-phase particles dispersed and precipitated in the intermediate alloy powder from obtaining higher sphericity and surface smoothness.

Thirdly, the second-phase matrix in the intermediate alloy powder is generally composed of elements with a low melting point and high activity. Therefore, during the atomizing solidification process, the impurity elements in the melt are liable to be combined with the second-phase matrix and enriched to the second-phase matrix, thereby purifying and protecting the first-phase particles. Meanwhile, due to the existence of a second-phase matrix, the crucible will interact with the melt during the melting process, thus the crucible-related impurities will enter the melt and be enriched in the second-phase matrix, so that the quality requirements for the crucibles in the melting process are further reduced, greatly reducing the production costs. In addition, as the first-phase particles are wrapped by the second-phase matrix, gas impurities introduced through the atmosphere are absorbed by the matrix during the atomizing solidification process and difficult to enter the first-phase particles, further protecting the first-phase particles from oxidation. Therefore, due to the protective effect of the second-phase matrix, during the preparation of the intermediate alloy powers, even if non-high-purity raw materials and ordinary crucibles are used, or other impurity elements enter the melt during the melting process and atomization powder spraying process, the first-phase particles with a low impurity content can be obtained, and the production cost of the target high-purity metal powder material is greatly reduced.

Fourthly, when M in the initial alloy melt of $A_aM_b$ or $A_aM_bAl_c$ is a combination of multiple elements which meet the selection conditions of M, the first-phase particles in the obtained intermediate alloy powder are also composed of multiple elements, which makes it easier and feasible to prepare the target alloy powder material composed of the first-phase particles, and greatly expands the composition range and application field of the target alloy powder material.

Finally, in step 3 of the present disclosure, according to the characteristics of low melting point and high activity composition of the second-phase matrix in the intermediate alloy powers, the second-phase matrix can be removed and the first-phase particles can be retained through at least one of the following three methods: 1) removing the second-phase matrix and meanwhile retaining the first-phase particles through corrosion of acid solution or alkali solution; 2) volatilizing and removing the second-phase matrix with a low melting point and meanwhile retaining the first-phase particles through vacuum volatilization; 3) when the matrix phase includes elements extremely easy to undergo natural oxidation with oxygen, for example, rare earth elements or the like, the second-phase matrix can be oxidized into oxide powders by a natural oxidation-powdering process. And then the target metal powder material can be obtained by further separating the first-phase particles from the oxide powders.

Therefore, the preparation method of the present disclosure adopts the combination of "atomization comminuting process+de-phasing method", has the advantages of simple process, easy operation, and low costs, and thus can be used to prepare various high-purity metal powder materials of nano-level, sub-micron-level, and micron-level. Therefore, the high-purity metal powder material has good application prospects in the fields such as catalysis, powder metallurgy, composite materials, sterilization, metal injection molding, 3D printing, and other additive manufacturing.

DETAILED DESCRIPTION

A method for preparing a high-purity powder material according to the present disclosure will be further described below in combination with the examples.

Example 1

This example provides a preparation method for nanometer CrV powders, which includes the following steps:

An alloy with the atomic percentage formula of $Zn_{58}(Cr_{50}V_{50})_{42}$ is selected, raw materials are weighed according to the formulation, after the initial alloy raw material is uniformly molten, the alloy melt is solidified and atomized through a gas atomization process, then sub-spheroidal intermediate alloy powders with a particle size of 3 μm to 150 μm are obtained. The solidification structure of the intermediate alloy powder is composed of a second-phase matrix with an ingredient of Zn and multiple high-melting-point first-phase particles with an ingredient of $Cr_{50}V_{50}$, the $Cr_{50}V_{50}$ particles are embedded in the Zn matrix in a dispersed manner, wherein the shape of the $Cr_{50}V_{50}$ particles is sub-spheroidal, and the particle size of the $Cr_{50}V_{50}$ particles is in a range of 3 nm to 300 nm. The volume content of the $Cr_{50}V_{50}$ particles in the intermediate alloy powder is about 38%; the impurities are enriched in the Zn matrix during the solidification process.

The Zn matrix in the intermediate alloy powder is volatilized and removed by vacuum heat treatment, so that the $Cr_{50}V_{50}$ particles which are difficult to be volatilized in the intermediate alloy powder can be separated, then nanometer $Cr_{50}V_{50}$ powders with a particle size being in a range of 3 nm to 300 nm are obtained, and the total content of H, O, N, S, P, F, Cl, I and Br in the $Cr_{50}V_{50}$ powders is lower than 1500 ppm.

Example 2

This example provides a preparation method for nanometer CrV powders, which includes the following steps:

An alloy with the atomic percentage formula of $Zn_{80}(Cr_{50}V_{50})_{20}$ is selected, raw materials are weighed according to the formulation, after the initial alloy raw material is uniformly molten, the alloy melt is solidified and atomized through a gas atomization process, then sub-spheroidal intermediate alloy powders with a particle size of 1 μm to 100 μm are obtained. The solidification structure of the intermediate alloy powder is composed of a second-phase matrix with an ingredient of Zn and multiple high-melting-point first-phase particles with an ingredient of $Cr_{50}V_{50}$, the $Cr_{50}V_{50}$ particles are embedded in the Zn matrix in a dispersed manner, wherein the shape of the $Cr_{50}V_{50}$ particles is sub-spheroidal, and the particle size of the $Cr_{50}V_{50}$ particles is in a range of 3 nm to 200 nm. The volume content of the $Cr_{50}V_{50}$ particles in the intermediate alloy powder is about 17.5%; the impurities are enriched in the Zn matrix during the solidification process.

The Zn matrix in the intermediate alloy powder is reacted and removed by sodium hydroxide solution, so that the $Cr_{50}V_{50}$ particles which do not react with alkali in the intermediate alloy powder can be separated, then nanometer $Cr_{50}V_{50}$ powders with a particle size in a range of 3 nm to 200 nm are obtained, and the total content of H, O, N, S, P, F, Cl, I and Br in the $Cr_{50}V_{50}$ powders is lower than 1600 ppm.

Example 3

This example provides a preparation method for sub-micron-level and micron-level Nb powders, which includes the following steps:

An alloy with the atomic percentage formula of $Cu_{54}Nb_{46}$ is selected, raw materials are weighed according to the formulation, after the initial alloy raw material is uniformly molten, the alloy melt is solidified and atomized through a gas atomization process, then sub-spheroidal intermediate alloy powders with a particle size of 5 μm to 500 μm are obtained. The solidification structure of the intermediate alloy powder is composed of a second-phase matrix with an ingredient of Cu and multiple high-melting-point first-phase particles with an ingredient of Nb, the Nb particles are embedded in the Cu matrix in a dispersed manner, wherein the shape of the Nb particles is sub-spheroidal, and the particle size of the Nb particles is in a range of 50 nm to 5 μm. The volume content of the Nb particles in the intermediate alloy powder is about 46%; the impurities are enriched in the Cu matrix during the solidification process.

The Cu matrix in the intermediate alloy powder is removed by hydrochloric acid, so that the Nb particles which are difficult to react with the hydrochloric acid can be separated, then Nb powders with a particle size in a range of 50 nm to 5 μm are obtained, and the total content of H, O, N, S, P, F, Cl, I and Br in the Nb powders is lower than 1400 ppm.

Example 4

This example provides a preparation method for nanometer FeNi powders, which includes the following steps:

An alloy with the atomic percentage formula of $Li_{10}(Fe_{50}Ni_{50})_{90}$ is selected, raw materials are weighed according to the formulation, after the initial alloy raw material is uniformly molten, the alloy melt is solidified and atomized through a gas atomization process, then sub-spheroidal intermediate alloy powders with a particle size of 3 μm to 120 μm are obtained. The solidification structure of the intermediate alloy powder is composed of a second-phase matrix shell with an ingredient of Li and high-melting-point first-phase particles with an ingredient of $Fe_{50}Ni_{50}$, the $Fe_{50}Ni_{50}$ core particles are embedded in the Li matrix shell, wherein the shape of the $Fe_{50}Ni_{50}$ particles is sub-spheroidal, and the particle size of the $Fe_{50}Ni_{50}$ particles is in a range of 2 μm to 110 μm. The volume content of the FeNi particles in the intermediate alloy powder is about 82%; the impurities are enriched in the Li matrix shell during the solidification process.

The $Fe_{50}Ni_{50}$ particles and the oxidized Li matrix (Lithium oxide powder) are separated from each other by an autoxidation-powdering process, in which the Li matrix shell can be autoxidated and the $Fe_{50}Ni_{50}$ particles can be separated by their magnetic property, then nanometer $Fe_{50}Ni_{50}$ powders with a particle size being in a range of 2 μm to 110 μm are obtained, and the total content of H, O, N, S, P, F, Cl, I and Br in the $Fe_{50}Ni_{50}$ powders is lower than 1800 ppm.

Example 5

This example provides a preparation method for micrometer Fe—Cr—V—Ti—Mo powders, which includes the following steps:

An alloy with the atomic percentage formula of $La_{10}(Fe_{20}Cr_{20}V_{20}Ti_{20}Mo_{20})_{90}$ is selected, raw materials are weighed according to the formulation, after the initial alloy raw material is uniformly molten, the alloy melt is solidified and atomized through a water atomization process, then sub-spheroidal intermediate alloy powders with a particle size of 3 μm to 150 μm are obtained. The solidification structure of the intermediate alloy powder is composed of a second-phase matrix shell with an ingredient of La and high-melting-point first-phase particles with an ingredient of $Fe_{20}Cr_{20}V_{20}Ti_{20}Mo_{20}$, the $Fe_{20}Cr_{20}V_{20}Ti_{20}Mo_{20}$ core particles are embedded in the La matrix shell, wherein the shape of the $Fe_{20}Cr_{20}V_{20}Ti_{20}Mo_{20}$ particles is sub-spheroidal, and the particle size of the $Fe_{20}Cr_{20}V_{20}Ti_{20}Mo_{20}$ particles is in a range of 2 μm to 144 μm. The volume content of the $Fe_{20}Cr_{20}V_{20}Ti_{20}Mo_{20}$ particles in the intermediate alloy powder is about 78%; the impurities are enriched in the La matrix shell during the solidification process.

The La matrix in the intermediate alloy powder is removed by dilute hydrochloric acid, so that the $Fe_{20}Cr_{20}V_{20}Ti_{20}Mo_{20}$ particles which are difficult to react with the dilute hydrochloric acid can be separated, then $Fe_{20}Cr_{20}V_{20}Ti_{20}Mo_{20}$ powders with a particle size being in a range of 2 μm to 144 μm are obtained, and the total content of H, O, N, S, P, F, Cl, I and Br in the $Fe_{20}Cr_{20}V_{20}Ti_{20}Mo_{20}$ powders is lower than 1800 ppm.

Example 6

This example provides a preparation method for micrometer Ti powders, which includes the following steps:

An alloy with the atomic percentage formula of $Ce_{25}Ti_{75}$ is selected, raw materials are weighed according to the formulation, after the initial alloy raw material is uniformly molten, the alloy melt is solidified and atomized through a gas atomization process, then sub-spheroidal intermediate alloy powders with a particle size of 5 μm to 100 μm are obtained. The solidification structure of the intermediate alloy powder is composed of a second-phase matrix with an ingredient of Ce and multiple high-melting-point first-phase particles with an ingredient of Ti, the Ti particles are embedded in the Ce matrix, wherein the shape of the Ti particles is sub-spheroidal or dendritic, and the particle size of the Ti particles is in a range of 2 μm to 50 μm. The volume content of the Ti particles in the intermediate alloy powder is about 61%; the impurities are enriched in the Ce matrix during the solidification process.

The Ce matrix in the intermediate alloy powder is removed by dilute acid solution, so that the Ti particles which are difficult to react with the dilute acid solution can be separated, then Ti powders with a particle size in a range of 2 μm to 50 μm are obtained, and the total content of H, O, N, S, P, F, Cl, I and Br in the Ti powders is lower than 1500 ppm.

Example 7

This example provides a preparation method for micron-level Ti—Zr—Hf—Nb—Ta high-Entropy powders, which includes the following steps:

An alloy with the atomic percentage formula of $Ce_{10}(Ti_{20}Zr_{20}Hf_{20}Nb_{20}Ta_{20})_{90}$ is selected, raw materials are weighed according to the formulation, after the initial alloy raw material is uniformly molten, the alloy melt is solidified and atomized through a water atomization process, then sub-spheroidal intermediate alloy powders with a particle size of 3 μm to 150 μm are obtained. The solidification structure of the intermediate alloy powder is composed of a second-phase matrix with an ingredient of Ce and a single high-melting-point first-phase particle with an ingredient of $Ti_{20}Zr_{20}Hf_{20}Nb_{20}Ta_{20}$, the $Ti_{20}Zr_{20}Hf_{20}Nb_{20}Ta_{20}$ core particle is embedded in the Ce matrix shell, wherein the shape of the $Ti_{20}Zr_{20}Hf_{20}Nb_{20}Ta_{20}$ particle is sub-spheroidal, and the particle size of the $Ti_{20}Zr_{20}Hf_{20}Nb_{20}Ta_{20}$ particle is in a range of 2 μm to 142 μm. The volume content of the $Ti_{20}Zr_{20}Hf_{20}Nb_{20}Ta_{20}$ particle in the intermediate alloy powder is about 84%; the impurities are enriched in the Ce matrix shell during the solidification process.

The Ce matrix shell in the intermediate alloy powder is removed by dilute acid, so that the $Ti_{20}Zr_{20}Hf_{20}Nb_{20}Ta_{20}$ particle which is difficult to react with the dilute acid can be separated, then $Ti_{20}Zr_{20}Hf_{20}Nb_{20}Ta_{20}$ powders with a particle size being in a range of 2 μm to 142 μm are obtained, and the total content of H, O, N, S, P, F, Cl, I and Br in the $Ti_{20}Zr_{20}Hf_{20}Nb_{20}Ta_{20}$ powders is lower than 1500 ppm.

Example 8

This example provides a preparation method for micron-level TiN powders, which includes the following steps:

An alloy with the atomic percentage formula of $Gd_{25}(Ti_{50}Ni_{50})_{75}$ is selected, raw materials are weighed according to the formulation, after the initial alloy raw material is uniformly molten, the alloy melt is solidified and atomized through a gas atomization process, then sub-spheroidal intermediate alloy powders with a particle size of 5 μm to 100 μm are obtained. The solidification structure of the intermediate alloy powder is composed of a second-phase matrix with an ingredient of Gd and multiple high-melting-point first-phase particles with an ingredient of $Ti_{50}Ni_{50}$, the $Ti_{50}Ni_{50}$ particles are embedded in the Gd matrix, wherein the shape of the $Ti_{50}Ni_{50}$ particle is sub-spheroidal or dendritic, and the particle size of the $Ti_{50}Ni_{50}$ particle is in a range of 2 μm to 50 μm. The volume content of the $Ti_{50}Ni_{50}$ particle in the intermediate alloy powder is about 56%; the impurities are enriched in the Gd matrix during the solidification process.

The Gd matrix in the intermediate alloy powder is removed by dilute acid, so that the $Ti_{50}Ni_{50}$ particle which is difficult to react with the dilute acid can be separated, then $Ti_{50}Ni_{50}$ powders with a particle size in a range of 2 μm to 50 μm are obtained, and the total content of H, O, N, S, P, F, Cl, I and Br in the $Ti_{50}Ni_{50}$ powders is lower than 1400 ppm.

Example 9

This example provides a preparation method for micrometer Fe—Cr—Ti powders, which includes the following steps:

An alloy with the atomic percentage formula of $La_2(Fe_{79}Cr_{20}Ti_1)_{98}$ is selected, raw materials are weighed according to the formulation, after the initial alloy raw material is uniformly molten, the alloy melt is solidified and atomized through a water atomization process, then sub-spheroidal intermediate alloy powders with a particle size of 3 μm to 150 μm are obtained. The solidification structure of the intermediate alloy powder is composed of a second-phase matrix shell with an ingredient of La and a single high-melting-point first-phase particle with an ingredient of $Fe_{79}Cr_{20}Ti_1$, the single $Fe_{79}Cr_{20}Ti_1$ core particle is embedded in the La matrix shell, wherein the shape of the $Fe_{79}Cr_{20}Ti_1$ particle is sub-spheroidal, and the particle size of the $Fe_{79}Cr_{20}Ti_1$ particle is in a range of 2.9 μm to 147 μm. The volume content of the $Fe_{79}Cr_{20}Ti_1$ particle in the intermediate alloy powder is about 94%; the impurities are enriched in the La matrix shell during the solidification process.

The La matrix shell in the intermediate alloy powder is removed by dilute hydrochloric acid, so that the $Fe_{79}Cr_{20}Ti_1$ particle which is difficult to react with the dilute hydrochloric acid can be separated, then $Fe_{79}Cr_{20}Ti_1$ powders with a particle size in a range of 2.9 μm to 147 μm are obtained, and the total content of H, O, N, S, P, F, Cl, I and Br in the $Fe_{79}Cr_{20}Ti_1$ powders is lower than 1800 ppm.

Example 10

This example provides a preparation method for micron-level Ti—Al—V powders, which includes the following steps:

An alloy with the atomic percentage formula of $Ce_{30}Al_{12}(Ti_{96}V_4)_{58}$ is selected, raw materials are weighed according to the formulation, after the initial alloy raw material is uniformly molten, the alloy melt is solidified and atomized through a gas atomization process, then sub-spheroidal intermediate alloy powders with a particle size of 3 μm to 150 μm are obtained. The solidification structure of the intermediate alloy powder is composed of a second-phase matrix with an ingredient of $Ce_{85}Al_{15}$ and multiple high-melting-point first-phase particles with an ingredient of $(Ti_{96}V_4)_{90}Al_{10}$, the $(Ti_{96}V_4)_{90}Al_{10}$ particles are embedded in the $Ce_{85}Al_{15}$ matrix, wherein the shape of the $(Ti_{96}V_4)_{90}Al_{10}$ particle is sub-spheroidal or dendritic, and the particle size of the $(Ti_{96}V_4)_{90}Al_{10}$ particle is in a range of 1 μm to 50 μm. The volume content of the $(Ti_{96}V_4)_{90}Al_{10}$ particle in the intermediate alloy powder is about 52%; the impurities are enriched in the $Ce_{85}Al_{15}$ matrix during the solidification process.

The $Ce_{85}Al_{15}$ matrix in the intermediate alloy powder is removed by dilute hydrochloric acid, so that the $(Ti_{96}V_4)_{90}Al_{10}$ particle which is difficult to react with the dilute hydrochloric acid can be separated, then $(Ti_{96}V_4)_{90}Al_{10}$ powders with a particle size being in a range of 1 μm to 50 μm are obtained, and the total content of H, O, N, S, P, F, Cl, I and Br in the $Ti_{50}Ni_{50}$ powders is lower than 1400 ppm.

Example 11

This example provides a preparation method for micron-level Fe—Cr—Nb—Mo—Ti—V powders, which includes the following steps:

An alloy with the atomic percentage formula of $La_{25}(Fe_{76}Cr_{16}Nb_2Mo_2Ti_2V_2)_{75}$ is selected, raw materials are weighed according to the formulation, after the initial alloy raw material is uniformly molten, the alloy melt is solidified and atomized through a gas atomization process, then sub-spheroidal intermediate alloy powders with a particle size of 2 μm to 150 μm are obtained. The solidification structure of the intermediate alloy powder is composed of a second-phase matrix with an ingredient of La and multiple high-melting-point first-phase particles with an ingredient of $Fe_{76}Cr_{16}Nb_2Mo_2Ti_2V_2$, the $Fe_{76}Cr_{16}Nb_2Mo_2Ti_2V_2$ particles are embedded in the La matrix, wherein the shape of the $Fe_{76}Cr_{16}Nb_2Mo_2Ti_2V_2$ particle is sub-spheroidal or dendritic, and the particle size of the $(Ti_{96}V_4)_{90}Al_{10}$ particle is in a range of 1 μm to 50 μm. The volume content of the $Fe_{76}Cr_{16}Nb_2Mo_2Ti_2V_2$ particle in the intermediate alloy powder is about 50%; the impurities are enriched in the La matrix during the solidification process.

The La matrix in the intermediate alloy powder is removed by dilute hydrochloric acid, so that the high Cr content of $Fe_{76}Cr_{16}Nb_2Mo_2Ti_2V_2$ particle which is difficult to react with the dilute hydrochloric acid can be separated, then $Fe_{76}Cr_{16}Nb_2Mo_2Ti_2V_2$ powders with a particle size in a range of 1 μm to 50 μm are obtained, the $Fe_{76}Cr_{16}Nb_2Mo_2Ti_2V_2$ powders are finer than the intermediate alloy powder, and the total content of H, O, N, S, P, F, Cl, I and Br in the $Fe_{76}Cr_{16}Nb_2Mo_2Ti_2V_2$ powders is lower than 1400 ppm.

Example 12

This example provides a preparation method for micron-level Fe—Cr—Mo—Ti powders, which includes the following steps:

An alloy with the atomic percentage formula of $La_5(Fe_{76}Cr_{20}Mo_2Ti_2)_{95}$ is selected, raw materials are weighed according to the formulation, after the initial alloy raw material is uniformly molten, the alloy melt is solidified and atomized through a water atomization process, then sub-spheroidal intermediate alloy powders with a particle size of 3 μm to 120 μm are obtained. The solidification structure of the intermediate alloy powder is composed of a second-phase matrix shell with an ingredient of La and a single high-melting-point first-phase particle with an ingredient of $Fe_{76}Cr_{20}Mo_2Ti_2$, the single $Fe_{76}Cr_{20}Mo_2Ti_2$ core particle is embedded in the La matrix shell, wherein the shape of the $Fe_{76}Cr_{20}Mo_2Ti_2$ particle is sub-spheroidal, and the particle size of the $Fe_{79}Cr_{20}Ti_1$ particle is in a range of 2 μm to 113 μm. The volume content of the $Fe_{76}Cr_{20}Mo_2Ti_2$ particle in the intermediate alloy powder is about 86%; the impurities are enriched in the La matrix shell during the solidification process.

The La matrix shell in the intermediate alloy powder is removed by dilute acid, so that the high Cr content of $Fe_{76}Cr_{20}Mo_2Ti_2$ particle which is difficult to react with the dilute acid can be separated, then the micron $Fe_{76}Cr_{20}Mo_2Ti_2$ powders with a particle size being in a range of 2 μm to 50 μm are obtained, the $Fe_{76}Cr_{20}Mo_2Ti_2$ powders are finer than the intermediate alloy powder, and the total content of H, O, N, S, P, F, Cl, I and Br in the micron $Fe_{76}Cr_{20}Mo_2Ti_2$ powders is lower than 1800 ppm.

Example 13

This example provides a preparation method for micron-level Fe—Cr—C powders, which includes the following steps:

An alloy with the atomic percentage formula of $La_{2.5}(Fe_{84.9}Cr_{15}C_{0.1})_{97.5}$ is selected, raw materials are weighed according to the formulation, after the initial alloy raw material is uniformly molten, the alloy melt is solidified and atomized through a water atomization process, then sub-spheroidal intermediate alloy powders with a particle size of 3 μm to 150 μm are obtained. The solidification structure of the intermediate alloy powder is composed of a second-phase matrix shell with an ingredient of La and a single high-melting-point first-phase particle with an ingredient of $Fe_{84.9}Cr_{15}C_{0.1}$, the single $Fe_{84.9}Cr_{15}C_{0.1}$ core particle is embedded in the La matrix shell, wherein the shape of the $Fe_{84.9}Cr_{15}C_{0.1}$ particle is sub-spheroidal, and the particle size of the $Fe_{84.9}Cr_{15}C_{0.1}$ particle is in a range of 2.9 μm to 146 μm. The volume content of the $Fe_{84.9}Cr_{15}C_{0.1}$ particle in the intermediate alloy powder is about 92%; the impurities are enriched in the La matrix shell during the solidification process.

The $Fe_{84.9}Cr_{15}C_{0.1}$ particles and the oxidized La matrix (Lanthanum oxide powder) are separated from each other by an autoxidation-powdering process, in which the La matrix shell can be autoxidated and the $Fe_{84.9}Cr_{15}C_{0.1}$ particles can be separated by their magnetic property, then micrometer $Fe_{84.9}Cr_{15}C_{0.1}$ powders with a particle size being in a range of 2 μm to 50 μm are obtained, and the total content of H, O, N, S, P, F, Cl, I and Br in the $Fe_{50}Ni_{50}$ powders is lower than 1600 ppm.

Example 14

This example provides a preparation method for nanometer Fe powders, which includes the following steps:

An alloy with the atomic percentage formula of $La_{59}Fe_{41}$ is selected, raw materials are weighed according to the formulation, after the initial alloy raw material is uniformly molten, the alloy melt is solidified and atomized through a water atomization process, then sub-spheroidal intermediate alloy powders with a particle size of 3 μm to 150 μm are obtained. The solidification structure of the intermediate alloy powder is composed of a second-phase matrix with an ingredient of La and multiple high-melting-point first-phase particles with an ingredient of Fe, the Fe particles are embedded in the La matrix, wherein the shape of the Fe particle is sub-spheroidal, and the particle size of the Fe particle is in a range of 3 nm to 300 nm. The volume content of the Fe particles in the intermediate alloy powder is about 18%; the impurities are enriched in the La matrix during the solidification process.

The Fe particles and the oxidized La matrix (Lanthanum oxide powder) are separated from each other by an autoxidation-powdering process, in which the La matrix can be autoxidated and the Fe particles can be separated by their magnetic property, then nanometer Fe powders with a particle size being in a range of 2 μm to 50 μm are obtained, and the total content of H, O, N, S, P, F, Cl, I and Br in the $Fe_{50}Ni_{50}$ powders is lower than 1900 ppm.

Example 15

This example provides a preparation method for sub-micron-level and micron-level Fe powders, which includes the following steps:

An alloy with the atomic percentage formula of $La_{40}Fe_{60}$ is selected, raw materials are weighed according to the formulation, after the initial alloy raw material is uniformly molten, the alloy melt is solidified and atomized through a water atomization process, then sub-spheroidal intermediate alloy powders with a particle size of 100 μm to 8 mm are obtained. The solidification structure of the intermediate alloy powder is composed of a second-phase matrix with an ingredient of La and multiple high-melting-point first-phase particles with an ingredient of Fe, the Fe particles are embedded in the La matrix, wherein the shape of the Fe particle is sub-spheroidal or dendritic, and the particle size of the Fe particle is in a range of 100 nm to 10 μm. The volume content of the Fe particles in the intermediate alloy powder is about 32%; the impurities are enriched in the La matrix during the solidification process.

The Fe particles and the oxidized La matrix (Lanthanum oxide powder) are separated from each other by an autoxidation-powdering process, in which the La matrix can be autoxidated and the Fe particles can be separated by their magnetic property, then Fe powders with a particle size being in a range of 100 nm to 10 μm are obtained, and the total content of H, O, N, S, P, F, Cl, I and Br in the Fe powders is lower than 1600 ppm.

The obtained Fe powders are further graded, to obtain the sub-micron Fe powders with a particle size in a range of 100 nm to 1 μm, and the ultrafine micron-level Fe powders with a particle size in a range of 1 μm to 10 μm.

Example 16

This example provides a preparation method for nanometer Ti powders and application thereof. The preparation method includes the following steps:

Sponge Ti and rare earth Ce raw material with the atomic percent contents of an impurity element T (including O, H, N, P, S, F, Cl, Br, and I) being 3 at. % and 2.5 at. % are selected respectively. The sponge Ti and rare earth Ce are sufficiently molten according to an approximate molar ratio of Ce:Ti being 2:1, so as to obtain a homogeneous initial alloy melt with the major atomic percent content being $Ce_{64.9}Ti_{32.5}T_{2.6}$.

The initial alloy melt is solidified and atomized through a water atomization process, then sub-spheroidal intermediate alloy powders with a particle size of 5 μm to 80 μm are obtained. The solidification structure of the intermediate alloy powder is composed of a second-phase matrix with a major ingredient of $Ce_{96.3}T_{3.7}$ and multiple first-phase particles with a major ingredient of $Ti_{99.7}T_{0.3}$, the $Ti_{99.7}T_{0.3}$ particles are embedded in the $Ce_{96.3}T_{3.7}$ matrix, wherein the shape of the $Ce_{96.3}T_{3.7}$ particle is sub-spheroidal, and the particle size of the $Ti_{99.7}T_{0.3}$ particle is in a range of 5 nm to 150 nm. The volume content of the $Ti_{99.7}T_{0.3}$ particles in the intermediate alloy powder is about 19.5%; The $Ce_{96.3}T_{3.7}$ matrix in the intermediate alloy powder is removed by a dilute acid, so that the $Ti_{99.7}T_{0.3}$ particle which is difficult to react with the dilute acid can be separated, then the nanometer $Ti_{99.7}T_{0.3}$ powders with a particle size being in a range of 5 nm to 150 nm are obtained, the nanometer $Ti_{99.7}T_{0.3}$ powders are finer than the intermediate alloy powder, and the total content of H, O, N, S, P, F, Cl, I and Br in the $Ti_{99.7}T_{0.3}$ powders is 0.3 at. %.

Under the protective atmosphere, the nanometer powder with the major ingredient being $Ti_{99.7}T_{0.3}$ and epoxy resin and other painting components are mixed to prepare a nanometer Ti-modified polymer corrosion-resistant painting.

Example 17

This example provides a preparation method for sub-micron Ti—Nb powders, which includes the following steps:

Sponge Ti, Nb sheets, and rare earth Gd raw material with the atomic percent contents of an impurity element T (including O, H, N, P, S, F, Cl, Br, and I) being 3 at. %, 1 at. % and 2.5 at. % are selected respectively. The sponge Ti, Nb sheets, and rare earth Gd are sufficiently molten according to an approximate molar ratio of Gd:Ti:Nb being 3:1:1, so as to obtain a homogeneous initial alloy melt with the major atomic percent content being $Gd_{58.7}Ti_{19.5}Nb_{19.5}T_{2.3}$.

The initial alloy melt is solidified and atomized through a gas atomization process, then sub-spheroidal intermediate alloy powders with a particle size of 15 μm to 150 μm are obtained. The solidification structure of the intermediate alloy powder is composed of a second-phase matrix with a major ingredient of $Gd_{96.4}T_{3.6}$ and multiple first-phase particles with a major ingredient of $Ti_{49.88}Nb_{49.88}T_{0.24}$, the $Ti_{49.88}Nb_{49.88}T_{0.24}$ particles are embedded in the $Gd_{96.4}T_{3.6}$ matrix, wherein the shape of the $Ti_{49.88}Nb_{49.88}T_{0.24}$ particle is sub-spheroidal, and the particle size of the $Ti_{49.88}Nb_{49.88}T_{0.24}$ particle is in a range of 50 nm to 500 nm. The volume content of the $Ti_{49.88}Nb_{49.88}T_{0.24}$ particles in the intermediate alloy powder is about 26%; The $Gd_{96.4}T_{3.6}$ matrix in the intermediate alloy powder is removed by dilute acid, so that the $Ti_{49.88}Nb_{49.88}T_{0.24}$ particle which is difficult to react with the dilute acid can be separated, then the sub-micron $Ti_{49.88}Nb_{49.88}T_{0.24}$ powders with a particle size being in a range of 50 nm to 500 nm are obtained, the sub-micron $Ti_{49.88}Nb_{49.88}T_{0.24}$ powders are finer than the intermediate alloy powder, and the total content of H, O, N, S, P, F, Cl, I and Br in the $Ti_{49.88}Nb_{49.88}T_{0.24}$ powders is 0.24 at. %.

Example 18

This example provides a preparation method for micron Ti powders, which includes the following steps:

Ti and rare earth Ce raw material with the atomic percent contents of an impurity element T (including O, H, N, P, S, F, Cl, Br, and I) being 1 at. % and 2.5 at. % are selected respectively.

The Ti and rare earth Ce are sufficiently molten according to an approximate molar ratio of Ce:Ti being 5:95, so as to obtain a homogeneous initial alloy melt with the major atomic percent content being $Ce_{4.9}Ti_{94}T_{1.1}$.

The initial alloy melt is solidified and atomized through a gas atomization process, then sub-spheroidal intermediate alloy powders with a particle size of 15 μm to 100 μm are obtained. The solidification structure of the intermediate alloy powder is composed of a second-phase matrix shell with a major ingredient of $Ce_{86}T_{14}$ and a single first-phase particle with a major ingredient of $Ti_{99.7}T_{0.3}$, the core $Ti_{99.7}T_{0.3}$ particle is embedded in the $Ce_{86}T_{14}$ matrix shell, wherein the particle size of the core $Ti_{99.7}T_{0.3}$ particle is in a range of 14.5 μm to 97 μm. The volume content of the $Ti_{99.7}T_{0.3}$ particle in the intermediate alloy powder is about 91%; The $Ce_{86}T_{14}$ matrix shell in the intermediate alloy powder is removed by a dilute acid, so that the $Ti_{99.7}T_{0.3}$ particle which is difficult to react with the dilute acid can be separated, then the micron $Ti_{99.7}T_{0.3}$ powders with a particle size being in a range of 14.5 μm to 97 μm are obtained, and the total content of H, O, N, S, P, F, Cl, I and Br in the $Ti_{99.7}T_{0.3}$ powders is 0.3 at. %.

Example 19

This example provides a preparation method for nano or sub-micron Fe powders, which includes the following steps:

Fe sheets and La raw material with the atomic percent contents of an impurity element T (including O, H, N, P, S, F, Cl, Br, and I) being 1 at. % and 2.5 at. % are selected respectively. The Fe sheets and La raw materials are sufficiently molten according to an approximate molar ratio of La:Fe being 3:2, so as to obtain a homogeneous initial alloy melt with the major atomic percent content being $La_{58.5}Fe_{39.6}T_{1.9}$.

The initial alloy melt is solidified and atomized through a gas atomization process, then sub-spheroidal intermediate alloy powders with a particle size of 15 μm to 150 μm are obtained. The solidification structure of the intermediate alloy powder is composed of a second-phase matrix with a major ingredient of $La_{97}T_3$ and multiple dispersed first-phase particles with a major ingredient of $Fe_{99.75}T_{0.25}$. Wherein the shape of the first-phase $Fe_{99.75}T_{0.25}$ particles is sub-spheroidal or dendritic, and the particle size of the $Fe_{99.75}T_{0.25}$ particles is in a range of 50 nm to 600 nm. The volume percent content of the first-phase $Fe_{99.75}T_{0.25}$ particles in the intermediate alloy powder is about 18%; The $Fe_{99.75}T_{0.25}$ particles and the oxidized $La_{97}T_3$ matrix (Lanthanum oxide powder) are separated from each other by an autoxidation-powdering process, in which the $La_{97}T_3$ matrix can be autoxidated and the $Fe_{99.75}T_{0.25}$ particles can be separated by their magnetic property, then nano or sub-micron $Fe_{99.75}T_{0.25}$ powders with a particle size being in a range of 50 nm to 600 nm are obtained, and the total content of H, O, N, S, P, F, Cl, I and Br in the $Fe_{99.75}T_{0.25}$ powders is 0.25 at. %.

Example 20

This example provides a preparation method for micron-level spheroidal TiNi powders, which includes the following steps:

Ti raw material, Ni sheets, and rear earth Gd raw material with the atomic percent contents of an impurity element T (including O, H, N, P, S, F, Cl, Br, and I) being 1 at. %, 0.5 at. % and 2.5 at. % are selected respectively. The initial raw materials are sufficiently molten according to an approximate molar ratio of Gd:Ti:Ni being 5:47.5:47.5, so as to obtain a homogeneous initial alloy melt with the major atomic percent content being $Gd_{4.9}Ti_{47.1}Ni_{47.1}T_{0.9}$.

The initial alloy melt is solidified and atomized through a gas atomization process, then sub-spheroidal intermediate alloy powders with a particle size of 15 μm to 100 μm are obtained. The solidification structure of the intermediate alloy powder is composed of a second-phase matrix shell with a major ingredient of $Gd_{87.5}T_{12.5}$ and a single first-phase particle with a major ingredient of $Ti_{49.9}Ni_{49.9}T_{0.2}$, the core $Ti_{49.9}Ni_{49.9}T_{0.2}$ particle is embedded in the $Gd_{87.5}T_{12.5}$ matrix shell, wherein the particle size of the core $Ti_{49.9}Ni_{49.9}T_{0.2}$ particle is in a range of 14.5 μm to 97 μm. The volume content of the first-phase $Ti_{49.9}Ni_{49.9}T_{0.2}$ particle in the intermediate alloy powder is about 89%; The $Gd_{87.5}T_{12.5}$ matrix shell in the intermediate alloy powder is removed by a dilute acid, so that the $Ti_{49.9}Ni_{49.9}T_{0.2}$ particle which is difficult to react with the dilute acid can be separated, then the micrometer $Ti_{49.9}Ni_{49.9}T_{0.2}$ powders and with a particle size being in a range of 14.5 μm to 97 μm are obtained, and the total content of H, O, N, S, P, F, Cl, I and Br in the $Ti_{49.9}Ni_{49.9}T_{0.2}$ powders is 0.2 at. %.

Example 21

This example provides a preparation method for nanometer Ti—V—Al alloy powders, which includes the following steps:

Sponge Ti, V sheets, rare earth Ce and Al raw material with the atomic percent contents of an impurity element T (including O, H, N, P, S, F, Cl, Br, and I) being 3 at. %, 1 at. %, 2.5 at. % and 0.2 at. % are selected respectively. The initial raw materials are sufficiently molten according to a calculated molar ratio so as to obtain a homogeneous initial alloy melt with the major atomic percent content being $Ce_{70.5}Al_{10}(Ti_{96}V_4)_{17}T_{2.5}$.

The initial alloy melt is solidified and atomized through a water atomization process, then sub-spheroidal intermediate alloy powders with a particle size of 5 μm to 100 μm are obtained. The solidification structure of the intermediate alloy powder is composed of a second-phase matrix with a major ingredient of $Ce_{86.5}Al_{10.5}T_3$ and multiple dispersed first-phase particles with a major ingredient of $(Ti_{96}V_4)_{92.25}Al_{7.5}T_{0.25}$, the $(Ti_{96}V_4)_{92.25}Al_{7.5}T_{0.25}$ particles are embedded in the $Ce_{86.5}Al_{10.5}T_3$ matrix, wherein the shape of the $(Ti_{96}V_4)_{92.25}Al_{7.5}T_{0.25}$ particle is sub-spheroidal, and the particle size of the $(Ti_{96}V_4)_{92.25}Al_{7.5}T_{0.25}$ particle is in a range of 10 nm to 200 nm. The volume content of the $(Ti_{96}V_4)_{92.25}Al_{7.5}T_{0.25}$ particles in the intermediate alloy powder is about 12%; The $Ce_{86.5}Al_{10.5}T_3$ matrix in the intermediate alloy powder is removed by a dilute acid, so that the $(Ti_{96}V_4)_{92.25}Al_{7.5}T_{0.25}$ particle which is difficult to react with the dilute acid can be separated, then the nano $(Ti_{96}V_4)_{92.25}Al_{7.5}T_{0.25}$ powders with a particle size being in a range of 50 nm to 200 nm are obtained, the nano $(Ti_{96}V_4)_{92.25}Al_{7.5}T_{0.25}$ powders are finer than the intermediate alloy powder, and the total content of H, O, N, S, P, F, Cl, I and Br in the $(Ti_{96}V_4)_{92.25}Al_{7.5}T_{0.25}$ powders is 0.25 at. %.

Under the protective atmosphere, the nanometer powder with the major ingredient being $(Ti_{96}V_4)_{92.25}Al_{7.5}T_{0.25}$ and epoxy resin and other painting components are mixed to prepare a nanometer Ti alloy modified polymer corrosion-resistant painting.

Example 22

This example provides a preparation method for micrometer Ti—V—Al alloy powders, which includes the following steps:

Sponge Ti, V sheets, rare earth Ce and Al raw material with the atomic percent contents of an impurity element T (including O, H, N, P, S, F, Cl, Br, and I) being 1 at. %, 1 at. %, 1 at. % and 1 at. % are selected respectively. The initial raw materials are sufficiently molten according to a calculated molar ratio so as to obtain a homogeneous initial alloy melt with the major atomic percent content being $Ce_{4.5}Al_{0.5}(Ti_{96}V_4)_{94}T_1$.

The initial alloy melt is solidified and atomized through a gas atomization process, then sub-spheroidal intermediate alloy powders with a particle size of 5 μm to 80 μm are obtained. The solidification structure of the intermediate alloy powder is composed of a second-phase matrix with a major ingredient of $Ce_{8.2}Al_{1.8}T_{16.2}$ and a first-phase particle with a major ingredient of $(Ti_{96}V_4)_{99.5}Al_{0.4}T_{0.1}$. The particle size of the $(Ti_{96}V_4)_{99.5}Al_{0.4}T_{0.1}$ particle is in a range of 4.85 μm to 78 μm, and the shape of the $(Ti_{96}V_4)_{99.5}Al_{0.4}T_{0.1}$ particle is sub-spheroidal; The structure of the intermediate alloy powder is a shell-core structure, a single first-phase particle is wrapped in the second-phase matrix shell, and the volume percent content of the $(Ti_{96}V_4)_{99.5}Al_{0.4}T_{0.1}$ particle in the intermediate alloy powder is about 90%; The $Ce_{82}Al_{1.8}Ti_{6.2}$ matrix in the intermediate alloy powder is removed by a dilute acid, so that the $(Ti_{96}V_4)_{99.5}Al_{0.4}T_{0.1}$ particle which is difficult to react with the dilute acid can be separated, then the $(Ti_{96}V_4)_{99.5}Al_{0.4}T_{0.1}$ powders and with a particle size being in a range of 4.85 μm to 78 μm are obtained, and the total content of H, O, N, S, P, F, Cl, I and Br in the $(Ti_{96}V_4)_{99.5}Al_{0.4}T_{0.1}$ powders is 0.1 at. %.

The obtained spheroidal $(Ti_{96}V_4)_{99.5}Al_{0.4}T_{0.1}$ alloy powder can be applied in fields of powder metallurgy, injection molding, or metal 3D printing.

Example 23

This example provides a preparation method for micrometer Nb powders, which includes the following steps:

Nb and Cu raw materials with the atomic percent contents of an impurity element T (including O, H, N, P, S, F, Cl, Br, and I) being 0.5 at. % and 0.5 at. % are selected respectively. The Nb and Cu raw materials are sufficiently molten according to an approximate molar ratio of Cu:Nb being 12:88, so as to obtain a homogeneous initial alloy melt with the major atomic percent content being $Cu_{11.9}Nb_{87.6}T_{0.5}$.

The initial alloy melt is solidified and atomized through a gas atomization process, then sub-spheroidal intermediate alloy powders with a particle size of 15 μm to 100 μm are obtained. The solidification structure of the intermediate alloy powder is composed of a second-phase matrix shell with a major ingredient of $Cu_{97.7}T_{2.3}$ and a single first-phase particle with a major ingredient of $Nb_{99.8}T_{0.2}$, the core $Nb_{99.8}T_{0.2}$ particle is embedded in the $Cu_{97.7}T_{2.3}$ matrix shell, wherein the particle size of the core $Cu_{97.7}T_{2.3}$ particle is in a range of 14.5 μm to 97 μm and the shape of the $Nb_{99.8}T_{0.2}$ particle is sub-spheroidal; The volume content of the $Nb_{99.8}T_{0.2}$ particle in the intermediate alloy powder is about 92%;

The $Cu_{97.7}T_{2.3}$ matrix shell in the intermediate alloy powder is removed by a concentrated hydrochloric acid solution, so that the core $Nb_{99.8}T_{0.2}$ particle which is difficult to react with the concentrated hydrochloric acid solution can be separated, then the micron $Nb_{99.8}T_{0.2}$ powders with a particle size being in a range of 14.5 μm to 97 μm are obtained, and the total content of H, O, N, S, P, F, Cl, I and Br in the $Nb_{99.8}T_{0.2}$ powders is 0.2 at. %.

Example 24

This example provides a preparation method for sub-micron Si powders, which includes the following steps:

Si and Zn raw materials with the atomic percent contents of an impurity element T (including O, H, N, P, S, F, Cl, Br, and I) being 0.5 at. % and 0.5 at. % are selected respectively. The initial raw materials are sufficiently molten according to an approximate molar ratio of Si:Zn being 30:70, so as to obtain a homogeneous initial alloy melt with the major atomic percent content being $Si_{29.85}Zn_{69.65}T_{0.5}$.

The initial alloy melt is solidified and atomized through a gas atomization process, then sub-spheroidal intermediate alloy powders with a particle size of 15 μm to 100 μm are obtained. The solidification structure of the intermediate alloy powder is composed of a second-phase matrix with a major ingredient of $Zn_{99.35}T_{0.65}$ and multiple dispersed first-phase particles with a major ingredient of $Si_{97.83}T_{0.17}$, the $Si_{97.83}T_{0.17}$ particles are embedded in the $Zn_{99.35}T_{0.65}$ matrix, wherein the shape of the $Si_{97.83}T_{0.17}$ particle is sub-spheroidal, and the particle size of the $Si_{97.83}T_{0.17}$ particle is in a range of 100 nm to 2 μm. The volume content of the $Si_{97.83}T_{0.17}$ particles in the intermediate alloy powder is about 36%;

The $Zn_{99.35}T_{0.65}$ matrix in the intermediate alloy powder is removed by hydrochloric acid solution, so that the $Si_{97.83}T_{0.17}$ particle which is difficult to react with the hydrochloric acid solution can be separated, then the sub-micron $Si_{97.83}T_{0.17}$ powders with a particle size being in a range of 100 nm to 2 μm are obtained, and the total content of H, O, N, S, P, F, Cl, I and Br in the $Si_{97.83}T_{0.17}$ powders is 0.17 at. %.

Example 25

This example provides a preparation method for micrometer Si powders, which includes the following steps:

Si and Zn raw materials with the atomic percent contents of an impurity element T (including O, H, N, P, S, F, Cl, Br, and I) being 0.5 at. % and 0.5 at. % are selected respectively. The initial raw materials are sufficiently molten according to an approximate molar ratio of Si:Zn being 90:10, so as to obtain a homogeneous initial alloy melt with the major atomic percent content being $Si_{89.55}Zn_{9.95}T_{0.5}$.

The initial alloy melt is solidified and atomized through a gas atomization process, then sub-spheroidal intermediate alloy powders with a particle size of 15 μm to 100 μm are obtained. The solidification structure of the intermediate alloy powder is composed of a second-phase matrix with a major ingredient of $Zn_{96.1}T_{3.9}$ and a first-phase particle with a major ingredient of $Si_{99.1}T_{0.1}$. The structure of the intermediate alloy powder is a shell-core structure, in which a single first-phase particle is inside, and the second-phase matrix is outside and wraps the first-phase particle. The particle size of the $Si_{99.1}T_{0.1}$ particle is in a range of 14.5 μm to 97 μm, the shape of the $Si_{99.1}T_{0.1}$ particle is sub-spheroidal, and the volume percent content of the $Si_{99.1}T_{0.1}$ particle in the intermediate alloy powder is about 92%;

The $Zn_{96.1}T_{3.9}$ matrix in the intermediate alloy powder is removed by hydrochloric acid solution, so that the $Si_{97.83}T_{0.17}$ particle which is difficult to react with the hydrochloric acid solution can be separated, then the micrometer $Si_{99.1}T_{0.1}$ powders and with a particle size being in a range of 14.5 μm to 97 μm are obtained, and the total content of H, O, N, S, P, F, Cl, I and Br in the $Si_{99.1}T_{0.1}$ powders is 0.1 at. %.

Example 26

This example provides a preparation method for nanometer CuSi powders, which includes the following steps:

Si raw material, Cu raw material, and Pb raw material with the atomic percent contents of an impurity element T (including O, H, N, P, S, F, Cl, Br, and I) being 0.5 at. %, 0.5 at. % and 0.5 at. % are selected respectively. The initial raw materials are sufficiently molten, wherein the approximate molar ratio of Cu:Si is 90:10, so as to obtain a homogeneous initial alloy melt with the major atomic percent content being $Pb_{74.5}(Cu_{90}Si_{10})_{25}T_{0.5}$.

The initial alloy melt is solidified and atomized through a water atomization process, then sub-spheroidal intermediate alloy powders with a particle size of 5 μm to 80 μm are obtained. The solidification structure of the intermediate alloy powder is composed of a second-phase matrix with a major ingredient of $Pb_{99.4}T_{0.6}$ and multiple dispersed first-phase particles with a major ingredient of $(Cu_{90}Si_{10})_{99.8}T_{0.2}$, the $(Cu_{90}Si_{10})_{99.8}T_{0.2}$ particles are embedded in the $Pb_{99.4}T_{0.6}$ matrix, wherein the shape of the $(Cu_{90}Si_{10})_{99.8}T_{0.2}$ particle is sub-spheroidal, and the particle size of the $(Cu_{90}Si_{10})_{99.8}T_{0.2}$ particle is in a range of 5 nm to 150 μm. The volume content of the $(Cu_{90}Si_{10})_{99.8}T_{0.2}$ particles in the intermediate alloy powder is about 12%;

The $Pb_{99.4}T_{0.6}$ matrix in the intermediate alloy powder is removed by a dilute hydrochloric acid-acetic acid mixed solution, so that the $(Cu_{90}Si_{10})_{99.8}T_{0.2}$ particle which is difficult to react with the diluted hydrochloric acid-acetic acid mixed solution can be separated, then the nano $(Cu_{90}Si_{10})_{99.8}T_{0.2}$ powders and with a particle size being in a range of 5 nm to 150 μm are obtained, and the total content of H, O, N, S, P, F, Cl, I and Br in the $(Cu_{90}Si_{10})_{99.8}T_{0.2}$ powders is 0.2 at. %.

Example 27

This example provides a preparation method for nanometer Ti powders and application thereof. The preparation method includes the following steps:

Sponge Ti and rare earth Ce raw materials with the atomic percent contents of an impurity element T (including O, H, N, P, S, F, Cl, Br, and I) being 3 at. % and 2.5 at. % are selected respectively. The sponge Ti further contains 0.5 at.

% of Mn; the rare earth Ce further contains 0.7 at. % of Mg. The sponge Ti and rare earth Ce are sufficiently molten according to an approximate molar ratio of Ce:Ti being 2:1, so as to obtain a homogeneous initial alloy melt with the major atomic percent content being $(Ce_{99.3}Mg_{0.7})_{64.9}(Ti_{99.5}Mn_{0.5})_{32.5}T_{2.6}$.

The initial alloy melt is solidified and atomized through a water atomization process, then sub-spheroidal intermediate alloy powders with a particle size of 5 μm to 80 μm are obtained. The solidification structure of the intermediate alloy powder is composed of a second-phase matrix with a major ingredient of $(Ce_{99.3}Mg_{0.7})_{96.3}T_{3.7}$ and multiple dispersed first-phase particles with a major ingredient of $(Ti_{99.5}Mn_{0.5})_{99.7}T_{0.3}$, the $(Ti_{99.5}Mn_{0.5})_{99.7}T_{0.3}$ particles are embedded in the $(Ce_{99.3}Mg_{0.7})_{96.3}T_{3.7}$ matrix, wherein the shape of the $(Ti_{99.5}Mn_{0.5})_{99.7}T_{0.3}$ particle is sub-spheroidal, and the particle size of the $(Ti_{99.5}Mn_{0.5})_{99.7}T_{0.3}$ particle is in a range of 5 nm to 150 μm. The volume content of the $(Ti_{99.5}Mn_{0.5})_{99.7}T_{0.3}$ particles in the intermediate alloy powder is about 19.5%;

The $(Ce_{99.3}Mg_{0.7})_{96.3}T_{3.7}$ matrix in the intermediate alloy powder is removed by a dilute acid solution, so that the $(Ti_{99.5}Mn_{0.5})_{99.7}T_{0.3}$ particle which is difficult to react with the diluted acid solution can be separated, then the nano $(Ti_{99.5}Mn_{0.5})_{99.7}T_{0.3}$ powders and with a particle size being in a range of 5 nm to 150 μm are obtained, the nano $(Ti_{99.5}Mn_{0.5})_{99.7}T_{0.3}$ powders are finer than the intermediate alloy powder, and the total content of H, O, N, S, P, F, Cl, I and Br in the $(Ti_{99.5}Mn_{0.5})_{99.7}T_{0.3}$ powders is 0.3 at. %.

Under the protective atmosphere, the nanometer powder with the major ingredient being $(Ti_{99.5}Mn_{0.5})_{99.7}T_{0.3}$ and epoxy resin and other painting components are mixed to prepare a nanometer Ti-modified polymer corrosion-resistant painting.

The technical features of the above examples may be arbitrarily combined. For conciseness, all possible combinations of the technical features of the above embodiments have not been completely described. However, as long as there is no contradiction between the combinations of these technical features, they shall be considered to be within the scope of the present disclosure.

The above examples only express several embodiments of the disclosure, and their descriptions are more specific and detailed, but they cannot be interpreted as a limitation on the scope of the present disclosure. It should be noted that for one of ordinary skill in the art, several variations and improvements may be made without deviating from the concept of the disclosure, which all fall within the scope of protection of the disclosure. Therefore, the scope of protection of the present disclosure shall be subject to the attached claims.

What is claimed is:

1. A method for preparing a powder material, comprising the following steps:
   at step 1, selecting initial alloy raw materials and melting the initial alloy raw materials to obtain a homogeneous initial alloy melt;
   at step 2, atomizing and solidifying the initial alloy melt through an atomization comminuting process to obtain an intermediate alloy powder; wherein the intermediate alloy powder comprises a first phase and a second phase, the first phase is granular, the second phase is a matrix phase with a melting point lower than that of the first phase, and first-phase particles are wrapped in the second-phase matrix; wherein during the atomization comminuting process, impurity elements in the initial alloy melt and introduced during an atomizing solidification process are enriched in the second-phase matrix such that the first-phase particles are purified; and
   at step 3, removing the second-phase matrix in the intermediate alloy powder, and retaining the first-phase particles, wherein the impurity elements enriched in the second-phase matrix are removed together with the second-phase matrix such that a high-purity target metal powder material composed of the first-phase particles is obtained.

2. The method according to claim 1, wherein the impurity element in the initial alloy melt is T, and T includes at least one of O, H, N, P, S, F, Cl, I, and Br.

3. The method according to claim 2, wherein the average ingredient of the initial alloy melt comprises any one of the following combinations (1)-(4) according to different proportions of the initial alloy raw materials:
   combination (1): the major average ingredient of the initial alloy melt is $A_a(M_xD_y)_bT_d$, A includes at least one of Y, La, Ce, Pr, Nd, Pm, Sm, Eu, Gd, Tb, Dy, Ho, Er, Tm, Yb, and Lu, M includes at least one of W, Cr, Mo, V, Ta, Nb, Zr, Hf, and Ti, D includes at least one of Fe, Co, and Ni, x, y; a, b, and c represent the atomic percent contents of corresponding constituent elements respectively, and $0.5\%\leq a\leq 99.5\%$, $0.5\%\leq b\leq 99.5\%$ and $0\leq d\leq 10\%$; $5\%\leq x\leq 55\%$ and $45\%\leq y\leq 95\%$;
   combination (2): the major average ingredient of the initial alloy melt is $A_aM_bT_d$, A includes at least one of Mg, Ca, Li, Na, K, Cu, Y, La, Ce, Pr, Nd, Pm, Sm, Eu, Gd, Tb, Dy, Ho, Er, Tm, Yb, and Lu, M includes at least one of W, Cr, Mo, V, Ta, Nb, Zr, Hf, and Ti, a, b, and c represent the atomic percent contents of corresponding constituent elements respectively, and $0.5\%\leq a\leq 99.5\%$, $0.5\%\leq b\leq 99.5\%$ and $0\leq d\leq 10\%$;
   combination (3): the major average ingredient of the initial alloy melt is $A_aM_bT_d$, A includes at least one of Zn, Mg, Sn, Pb, Ga, In, Al, La, Ge, K, Na, and Li, M includes at least one of Be, B, Bi, Fe, Ni, Cu, Ag, Si, Ge, Cr, and V, and the proportion of the atomic percent contents of Be, B, Si, and Ge in M to M is smaller than 50%; a, b, and c represent the atomic percent contents of corresponding constituent elements respectively, and $0.5\%\leq a\leq 99.5\%$, $0.5\%\leq b\leq 99.5\%$, and $0\leq d\leq 10\%$; and
   combination (4): when the major average ingredient of the initial alloy melt is $A_aM_bAl_cT_d$, A includes at least one of Y, La, Ge, Pr, Nd, Pm, Sm, Eu, Gd, Tb, Dy, Ho, Er, Tm, Yb, and Lu; M includes at least one of W, Cr, Mo, V, Ta, Nb, Zr, Hf, and Ti; Al is aluminum; a, b, c, and d represent the atomic percent contents of corresponding constituent elements respectively, and $0.5\%\leq a\leq 99.4\%$, $0.5\%\leq b\leq 99.4\%$, $0.1\%\leq c\leq 25\%$, and $0\leq d\leq 10\%$.

4. The method according to claim 3, wherein
   when the average ingredient of the initial alloy melt is the combination (1) of step 1, an initial alloy powder comprises the first-phase particles with the major ingredient of $(M_xD_y)_{x1}T_{z1}$, and the second-phase matrix with the major ingredient of $A_{x2}T_{z2}$; $98\%\leq x1\leq 100\%$ and $0\leq z1\leq 2\%$; $70\%\leq x2\leq 100\%$ and $0\leq z2\leq 30\%$; $z1\leq d\leq z2$ and $2z1\leq z2$; and x1, z1, x2, and z2 represent the atomic percent contents of corresponding constituent elements respectively;
   when the average ingredient of the initial alloy melt is the combination (2) or combination (3) of step 1, the initial alloy powder comprises the first-phase particles with the major ingredient of $M_{x1}T_{z1}$ and the second-phase matrix with the major ingredient of $A_{x2}T_{z2}$;

98%≤x1≤100% and 0≤z1≤2%; 70%≤x2≤100% and 0≤z2≤30%; z1≤d≤z2 and 2z1≤z2; and x1, z1, x2, and z2 represent the atomic percent contents of corresponding constituent elements respectively; and when the average ingredient of the initial alloy melt is the combination (4) of step 1, the initial alloy powder comprises the first-phase particles with the major ingredient of $M_{x1}Al_{y1}T_{z1}$ and the second-phase matrix with the major ingredient of $A_{x2}Al_{y2}T_{z2}$, 78%≤x1≤99.9%, 0.1%≤y1≤22% and 0≤z1≤2%; 70%≤x2≤99.8%, 0.2%≤y2≤30%, 0≤z2≤30%, z1≤d≤z2, and 2z1≤z2, and x1, y1, z1, x2, y2, and z2 represent the atomic percent contents of corresponding constituent elements respectively.

5. The method according to claim 1, wherein the atomization comminuting process includes at least one of gas atomization, water atomization, water and gas combined atomization, vacuum atomization, plasma atomization, centrifugal atomization, rotating disk atomization, and rotating electrode atomization.

6. The method according to claim 1, wherein the structure in which the first-phase particles are wrapped in the second-phase matrix includes: a mosaic structure in which a plurality of the first-phase particles are distributed in the second-phase matrix in a dispersed manner, or a core-shell structure in which a single first-phase particle of the first-phase particles is inside and the second-phase matrix is outside.

7. The method according to claim 1, wherein the method for removing the second-phase matrix in the intermediate alloy powders includes at least one of an acid reaction for removal, an alkali reaction for removal, a vacuum volatilization for removal, and a second-phase matrix natural oxidation-powdering peeling removal.

8. The method according to claim 1, wherein the particle size of the high-purity target powder material is in a range of 3 nm to 7.9 mm.

9. An application of the high-purity powder material according to claim 1 in a field selected from the group consisting of catalytic materials, powder metallurgy, composite materials, wave-absorbing materials, sterilization materials, metal injection molding, 3D printing additive manufacturing, and coating.

10. A method for preparing a powder material, comprising the following steps:
- at step 1, selecting initial alloy raw materials, melting the initial alloy raw materials to obtain a homogeneous initial alloy melt;
- at step 2, atomizing and solidifying the initial alloy melt through an atomization comminuting process, to obtain an intermediate alloy powder; wherein the intermediate alloy powder comprises a first phase and a second phase, the first phase is granular, the second phase is a matrix phase with a melting point lower than that of the first phase, and first-phase particles are wrapped in the second-phase matrix; during the atomization comminuting process, impurity elements in the initial alloy melt and introduced during an atomizing solidification process are enriched in the second-phase matrix, so that the first-phase particles are purified;
- at step 3, removing the second-phase matrix in the intermediate alloy powder, and retaining the first-phase particles, wherein the impurity elements enriched in the second-phase matrix are removed together with the second-phase matrix, so that a high-purity target powder material composed of the first-phase particles is obtained;

wherein the impurity element in the initial alloy melt is T, and T includes at least one of O, H, N, P, S, F, Cl, I, and Br;

the major average ingredient of the initial alloy melt is $A_aM_bT_d$, A includes at least one of Zn, Sn, Pb, Ga, In, Al, Ge, and Cu; M includes at least one of Be, Si, Ge, and B, and the proportion of the atomic percent contents of Be, Si, Ge, and B in M to M is greater than or equal to 50%, a, b and c represent the atomic percent contents of corresponding constituent elements respectively, and 0.5%≤a≤99.5%, 0.5%≤b≤99.5%, and 0≤d≤10%; and the initial alloy powder comprises the first-phase particles with the major ingredient of $M_{x1}T_{z1}$ and the second-phase matrix with the major ingredient of $A_{x2}T_{z2}$; 98%≤x1≤100% and 0≤z1≤2%; 70%≤x2≤100% and 0≤z2≤30%; z1≤d≤z2 and 2z1≤z2; x1, z1, x2, and z2 represent the atomic percent contents of corresponding constituent elements respectively.

* * * * *